(12) United States Patent
Oshima et al.

(10) Patent No.: US 11,623,975 B2
(45) Date of Patent: Apr. 11, 2023

(54) MOLDING MATERIAL AND METHOD FOR PRODUCING RESIN MOLDED BODY USING SAME

(71) Applicants: OSAKA UNIVERSITY, Suita (JP); DAIKIN INDUSTRIES, LTD., Osaka (JP)

(72) Inventors: Akihiro Oshima, Suita (JP); Kazuyuki Satoh, Osaka (JP); Mitsuhiro Usugaya, Osaka (JP); Yoshikage Ohmukai, Osaka (JP); Yuko Shiotani, Osaka (JP)

(73) Assignees: OSAKA UNIVERSITY, Suita (JP); DAIKIN INDUSTRIES, LTD., Osaka (JP)

( * ) Notice: Subject to any disclaimer, the term of this patent is extended or adjusted under 35 U.S.C. 154(b) by 454 days.

(21) Appl. No.: 16/481,117

(22) PCT Filed: Jan. 26, 2018

(86) PCT No.: PCT/JP2018/002403
§ 371 (c)(1),
(2) Date: Jul. 26, 2019

(87) PCT Pub. No.: WO2018/139567
PCT Pub. Date: Aug. 2, 2018

(65) Prior Publication Data
US 2020/0270386 A1    Aug. 27, 2020

(30) Foreign Application Priority Data

Jan. 27, 2017 (JP) ............... JP2017-013516
Nov. 17, 2017 (JP) ............... JP2017-222187

(51) Int. Cl.
*C08F 277/00* (2006.01)
*B29C 35/08* (2006.01)
*B29K 23/00* (2006.01)

(52) U.S. Cl.
CPC ........ *C08F 277/00* (2013.01); *B29C 35/0866* (2013.01); *B29C 2035/0877* (2013.01); *B29K 2023/38* (2013.01)

(58) Field of Classification Search
CPC .............. C08F 255/00; C08F 220/1818; C08F 220/24; C08F 255/08; C08F 255/23; C08F 255/26; C08F 255/04; C08F 255/10
See application file for complete search history.

(56) References Cited

U.S. PATENT DOCUMENTS

| | | | | |
|---|---|---|---|---|
| 5,314,959 A | * | 5/1994 | Rolando | C08F 255/02 525/308 |
| 6,337,373 B1 | * | 1/2002 | Formaro | C08J 9/405 525/193 |
| 11,225,557 B2 | * | 1/2022 | Satoh | C08F 255/00 |

FOREIGN PATENT DOCUMENTS

| | | | |
|---|---|---|---|
| EP | 0 040 923 A2 | 12/1981 | |
| GB | 1 516 648 A | 7/1978 | |
| JP | 47-23426 B1 | 6/1972 | |
| WO | 2015/152310 A1 | 10/2015 | |
| WO | WO-2017154829 A1 * | 9/2017 | ............ C08F 255/00 |

OTHER PUBLICATIONS

International Preliminary Report on Patentability with a Translation of Written Opinion in International Application No. PCT/JP2018/002403, dated Aug. 8, 2019.
Communication dated Jul. 14, 2020, from the European Patent Office in European Application No. 18744844.4.
International Search Report for PCT/JP2018/002403 dated Apr. 17, 2018 [PCT/ISA/210].

* cited by examiner

*Primary Examiner* — Mark S Kaucher
(74) *Attorney, Agent, or Firm* — Sughrue Mion, PLLC

(57) ABSTRACT

A molding material including a resin material that has a graft chain containing constituent units derived from a fluorine-containing compound and a non-fluorinated compound. The graft chain thereof may be formed, for example, using ionizing radiation.

14 Claims, 1 Drawing Sheet

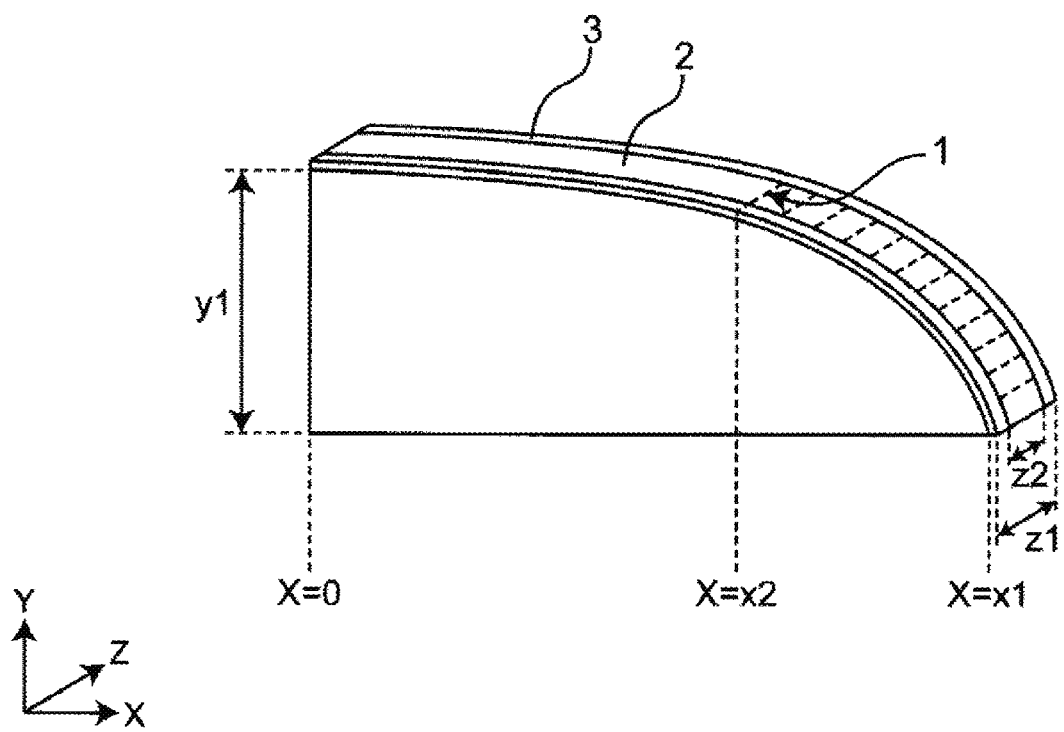

MOLDING MATERIAL AND METHOD FOR PRODUCING RESIN MOLDED BODY USING SAME

CROSS REFERENCE TO RELATED APPLICATIONS

This application is a National Stage of International Application No. PCT/JP2018/002403, filed on Jan. 26, 2018, which claims priority from Japanese Patent Application No. 2017-013516, filed on Jan. 27, 2017, and Japanese Patent Application No. 2017-222187, filed on Nov. 17, 2017.

TECHNICAL FIELD

The present invention relates to a molding material and a method for producing a resin molded body using the same, and more specifically relates to a molding material that has a fluorine-containing graft chain and a method for producing a resin molded body comprising this molding material.

BACKGROUND ART

Resin molded bodies have been utilized in a variety of fields such as the field of medical members, optical members, architectural members, clothing materials, packagings, containers and molds. To such resin molded bodies, a variety of functions such as water-repellency and oil-repellency are imparted depending on applications.

Conventionally, as a method for imparting functions such as water-repellency and oil-repellency to resin molded bodies, a method has been known in which, after the molding, the surface of the molded body is irradiated with ionizing radiation to produce radicals, and then a fluorine-containing monomer is grafted thereon (Patent Literature 1).

CITATION LIST

Patent Literature

Patent Literature 1: International Publication No. WO2015/152310

Solution to Problem

The present invention provides the following:

A molding material comprising a resin material that has a graft chain containing constituent units derived from a fluorine-containing compound and a non-fluorinated compound.

Effects

As a result of diligent researches by the present inventors in order to solve the above-described problems, it has been found that, by performing grafting treatment on a resin material to obtain a molding material prior to molding and then performing molding of the obtained molding material, a resin molded body that has a graft chain on its surface and that has an improved oil-repellency of the surface can be obtained through simple operations, thereby leading to the completion of the present invention. Furthermore, the present inventors have found a novel molding material (the raw material for the resin molded body) suitable for the above-described production method for the resin molded body.

BRIEF DESCRIPTION OF DRAWING

FIG. 1 is a schematic drawing showing the measurement state of critical stress for solvent cracking.

DESCRIPTION OF EMBODIMENTS

Hereinafter, a method suitable for producing a resin molded body of the present invention will be described in detail, but the method for producing a resin molded body of the present invention is not limited to the method described below.

The method for producing a resin molded body of the present invention includes irradiating a resin material with radiation to introduce a graft chain containing constituent units derived from a fluorine-containing compound and constituent units derived from a non-fluorinated compound to the resin material to obtain a molding material and molding the obtained molding material.

The molding material used in the above-described method includes a graft chain containing constituent units derived from a fluorine-containing compound and a non-fluorinated compound, and a resin material. That is, the molding material includes a resin material that has a graft chain formed by copolymerization between a fluorine-containing compound and a non-fluorinated compound. For example, the content of the resin material that has a graft chain is preferably within the range of 0.001 to 100 parts by mass relative to 100 parts by mass of the molding material used for molding.

The molding material may include other materials such as coloring agents including dyes and pigments, and bulking agents including fillers (in particular, ceramic materials such as various metal powders, silver nanowires, carbon fibers, glass fibers, carbon nanotubes, graphenes, calcium carbonate, titanium oxide and silica).

The content of the fluorine-containing grafting compound (graft chain) included in the above-described molding material is preferably 0.01 to 1000 parts by mass, more preferably 0.1 to 100 parts by mass, and further more preferably 1 to 20 parts by mass relative to 100 parts by mass of the resin material that has the graft chain. The content of the fluorine-containing grafting compound can be determined through elemental analysis for fluorine, 19F-NMR or the like.

The above-described molding material is a material used for molding a resin molded body and has a relatively small size although it depends on a molding method.

The surface area of the molding material is preferably 600 $mm^2$ or less, more preferably 400 $mm^2$ or less, further preferably 300 $mm^2$ or less, and further more preferably 150 $mm^2$ or less, for example, 100 $mm^2$ or less or 80 $mm^2$ or less. In addition, the surface area of the molding material is preferably 0.1 $mm^2$ or more, more preferably 1.0 $mm^2$ or more, further preferably 2.0 $mm^2$ or more, and further more preferably 10.0 $mm^2$ or more, and it may be, for example, 30.0 $mm^2$ or more or 50.0 $mm^2$ or more. The surface area of the molding material can be measured by using, for example, the gas adsorption method.

The volume of the molding material is preferably 1000 $mm^3$ or less, more preferably 600 $mm^3$ or less, further preferably 300 $mm^3$ or less, and further more preferably 200 $mm^3$ or less, for example, 100 $mm^3$ or less or 80 $mm^3$ or less. In addition, the volume of the molding material is preferably 0.01 $mm^3$ or more, more preferably 0.5 $mm^3$ or more, further preferably 1.0 $mm^3$ or more, further more preferably 5.0 $mm^3$ or more, and particularly preferably 10.0 $mm^3$ or more, and it may be, for example, 20.0 $mm^3$ or more or 30.0 $mm^3$ or more. The volume of the molding material can be measured by using, for example, a laser-displacement meter.

By making the size of the molding material bigger, it becomes easier to handle the resin material during the grafting reaction treatment in order to obtain the molding material. On the other hand, by making the size of the molding material smaller, it becomes easier to perform the molding and processing treatment.

The shape of the molding material is not limited as long as it is a form suitable for molding a resin molded body, and it may be, for example, powdery, particulate, chip-shaped, fibrous, pellet-shaped or the like.

In the present specification, powder (or pulverulent body) means powder having an average particle diameter of, for example, 0.1 to 500 µm, preferably 1.0 to 300 µm such as 10 to 200 µm, 20 µm to 200 µm or 30 to 100 µm. The average particle diameter here denotes a volume average particle diameter. The average particle diameter can be measured by using, for example, a laser displacement meter, an electron microscope or an atomic force microscope. For a system dispersible to a solution, the measurement can be carried out using Zetasizer or the like.

In the present specification, the particle means a particle having an average particle diameter of, for example, 500 to 1000 µm, preferably 60 to 800 µm.

In the present specification, the pellet has an arbitrary shape such as sphere, prolate spheroid, flat sphere, bar, plate, block or those similar to them with a maximum diameter of 0.8 to 8.0 mm, preferably 1.2 to 5.0 mm, and more preferably 1.5 to 3.0 mm.

In the present specification, the chip has an arbitrary shape such as sphere, prolate spheroid, flat sphere, bar, plate, block or those similar to them with a maximum length of 8.0 to 20 mm and preferably 10 to 15 mm.

In the present specification, the fiber has a maximum diameter of, for example, 0.8 to 1.0 mm, preferably 0.01 to 0.2 mm, and more preferably 0.02 to 0.1 mm, and is a short fiber with a fiber length of less than 5 cm, preferably 2 cm.

In one embodiment, the molding material is a pulverulent body or a pellet, or a mixture thereof.

In one embodiment, the molding material is a fiber.

In a preferable embodiment, the molding material is a pulverulent body.

In another preferable embodiment, the molding material is a pellet. The pellet is preferable from the viewpoint where handling upon the molding is satisfactory.

Furthermore, in another preferable embodiment, the molding material is a mixture of a pulverulent body and a pellet.

Examples of a resin constituting the resin material used in the present invention are not limited, but it may be a resin that does not have desired functions such as antifouling property, water-repellency and oil-repellency, or a resin in which desired functions are not sufficient, such as a non-fluorinated resin (which may also be referred to as a general purpose resin) or a fluororesin. One of these resins may be used singly, or a plurality of them may be used in combination.

The above-described non-fluorinated resin is not limited as long as it is a resin into which the graft chain is introduced, for example, in the case where the graft chain is introduced by applying radiation, which will be described later, a resin in which intermediate active species such as radical which is as a reaction initiation point can be directly or indirectly produced by irradiation with radiation, particularly ionizing radiation. For example, examples of the non-fluorinated resin include polyolefin resin such as polyethylene (for example, linear low density polyethylene, low density polyethylene, high density polyethylene, ultra high molecular weight polyethylene and the like), polypropylene including various structural isomers (syndiotactic, isotactic and atactic structures), poly-(4-methylpentene-1), ethylene-propylene copolymer, ethylene-vinyl acetate copolymer (EVA), chlorinated polyethylene resin, and modified polyolefin, cycloolefin resin, polyvinyl chloride resin such as polyvinyl chloride, polyvinylidene chloride, polystyrene or polystyrene derivative resin including various structural isomers, polyamide, polyimide, polyamideimide, polycarbonate, ionomer, acrylic resin such as polymethyl methacrylate (PMMA) including various structural isomers, acrylstyrene copolymer (AS resin), butadiene-styrene copolymer, ethylene-vinyl alcohol copolymer (EVOH), polyester such as polyethylene terephthalate (PET), polybutylene terephthalate (PBT) and polycyclohexane terephthalate (PCT), polyether, polyetherketone (PEK), polyetheretherketone (PEEK), polyetherimide, polyacetal (POM), polyphenylene oxide, modified polyphenylene oxide, polyarylate, aromatic polyester (liquid crystal polymer), polyurethane resin, epoxy resin, phenolic resin, urea resin, melamine resin, unsaturated polyester, silicone resin, polydimethylsilicone (PDMS), polyurethane, polylactic acid (PLA), biodegradable resin such as polycaprolactone, or copolymer, mixture, polymer alloy and the like including them. Among these, cycloolefin resin, polyethylene and polypropylene are preferable because they can satisfactorily impart functions such as antifouling property, water-repellency and oil-repellency to the surface.

Examples of the above-described fluororesin include ethylene-tetrafluoroethylene copolymer (ETFE), vinylidene fluoride-hexafluoropropylene-tetrafluoroethylene copolymer (FKM), polytetrafluoroethylene, tetrafluoroethylene-hexafluoropropylene copolymer (FEP), tetrafluoroethylene-perfluoroalkoxyethylene copolymer (PFA), ethylene-chlorotrifluoroethylene copolymer (ECTFE), polyvinyl fluoride (PVF), polyvinylidene fluoride (PVDF), polychlorotrifluoroethylene (PCTFE), vinylidene fluoride-hexafluoropropylene copolymer (VdF-HFP), vinylidene fluoride-tetrafluoroethylene-hexafluoropropylene copolymer (VdF-TFE-HFP), other fluororesins, fluororubbers and the like, and it may also be a mixture or polymer alloy thereof. Among these, PVdF and ETFE are preferable because they can impart functions such as antifouling property, water-repellency and oil-repellency, as well as lubricity.

In one embodiment, as the resin material, a resin crosslinked by irradiation with radiation (in particular, ionizing radiation) may be used. In the present embodiment, the graft chain is introduced to the above-described resin having a crosslinked structure. The irradiation with radiation for crosslinking the resin may be carried out using reaction conditions generally used by those having ordinary skill in the art. For example, the irradiation amount of ionizing radiation is, for example, preferably 10 kGy or more, more preferably 50 kGy or more, further preferably 100 kGy or more, particularly preferably 500 kGy or more, and more preferably 1000 kGy or more.

The above-described graft chain may be a branched chain that branched from and is covalent bonded to the polymer backbone of the resin material. The above-described graft chain is, for example, an alternating copolymer, random copolymer and block copolymer between the fluorine-containing compound and the non-fluorinated compound, and may include a homopolymer of the fluorine-containing compound or a homopolymer of the non-fluorinated compound. Preferably, the above-described graft chain includes at least one selected from an alternating copolymer, random copolymer and block copolymer between the fluorine-containing compound and the non-fluorinated compound, and is more preferably at least one selected from a random copolymer and block copolymer.

In a certain embodiment, the polymer that forms the resin material and/or the graft chain may have a crosslinked structure. With such crosslinkage, the resin material may have a network structure. The structure as described above may be formed by (1) introducing the graft chain containing constituent units derived from the fluorine-containing compound and constituent units derived from the non-fluorinated compound to the resin material by, for example, irradiating the resin material with radiation, to obtain a molding material and molding the obtained molding material; and (2) crosslinking the polymer that forms the resin material and/or the graft chain.

In the present embodiment, more specifically, a part of the graft chain may crosslink to the polymer backbone of the resin material. Alternatively, the graft chain may be introduced into a crosslinked resin material.

In one embodiment, the molding material may be formed by using a resin crosslinked by irradiation with radiation (in particular, ionizing radiation) as the resin material, and introducing the graft chain into such a resin material. The irradiation of radiation for crosslinking the resin can be carried out using reaction conditions generally used by those having ordinary skill in the art. For example, the irradiation amount of ionizing radiation is, for example, preferably 10 kGy or more, more preferably 50 kGy or more, further preferably 100 kGy or more, particularly preferably 500 kGy or more, and more preferably 1000 kGy or more.

The graft chain is present at least on the surface of the molding material. For example, spectroscopic analysis on the surface of the molding material (for example, up to the depth of a few micrometers) may confirm whether the surface of the molding material has the graft chain. Examples of a method of spectroscopic analysis that can be used include, for example, observation of the outermost surface through micro-X-ray photoelectron spectroscopy (micro-XPS), attenuated total reflection (ATR) through infrared spectroscopy, or the like; or cross-sectional observation through a FT-Raman microscope (including imaging) or SEM-EDX (energy dispersive X-ray spectroscopy).

The molding material after the above-described grafting reaction may have the graft chain from the surface to the inside. The depth to which this graft chain is formed can vary depending on the capacity of a device for irradiation with radiation or the time of grafting reaction. For example, when the molding material is irradiated with electron beam at a high accelerating voltage of 10 MV, the graft chain may grow to the maximum depth of approximately 20 mm from the surface of the molding material. Even when the accelerating voltage is 10 MV, by adjusting the reaction time, the distribution of the graft chain or the depth to which the graft chain is formed from the surface of the molding material may be controlled. For example, by shortening the reaction time, the depth to which the graft chain is formed from the surface of the molding material can be made shallower. In addition, as described in the literature (A. Oshima et al., Radiait. Phys. Chem. Vol. 80, pp. 196-200, 2011), the depth to which electron beam penetrates can be controlled by adjusting the accelerating voltage of a device for irradiation with electron beam. For example, by lowering the accelerating voltage, the depth to which electron beam penetrates becomes shallower, and thus, the distribution of intermediate active species such as radicals induced inside the molding material can be controlled only to the vicinity of the surface of such a material. As such, the distribution of the graft chain introduced via the grafting reaction can be controlled along the depth direction of the molding material.

The graft chain according to the present invention is present to the maximum depth of 20 mm, preferably to the maximum depth of 1 mm, more preferably to the maximum depth of 500 µm, further preferably to the maximum depth of 200 µm, and further more preferably to the maximum depth of 100 µm from the surface of the molding material.

Preferably, the depth to which the graft chain is present can be a depth of 0.001 to 99%, for example, a depth of 0.01 to 99% or a depth of 0.1 to 99% of the thickness of the molding material from the surface of the molding material. The depth to which the graft chain is present may be preferably a depth of 1 to 95%, more preferably 3 to 90%, more preferably a depth of 5 to 80%, further preferably a depth of 10 to 60%, and further more preferably a depth of 20 to 60% from the surface of the molding material.

When the thickness over which the graft chain is present from the surface of the molding material after the grafting reaction becomes higher, desired functionalities expressed in a resin molded body obtained through molding and processing will be improved. On the other hand, when the thickness over which the graft chain is present becomes lower, the strength of the molding material and a resin molded body obtained through molding and processing will be improved.

On the surface of the above-described resin molded body obtained through molding and processing of the molding material after such a grafting reaction, constituent units derived from the fluorine-containing grafting compound are preferably present. A functionalized area in the resin molded body by the fluorine-containing grafting compound (that is, an area of the resin molded body in which constituent units derived from the fluorine-containing grafting compound are present, for example, an area to a depth of 10 mm from the surface of the resin molded body) is preferably present to the maximum depth of approximately 10 mm from the surface of the resin molded body although it depends on the content of the constituent units derived from the fluorine-containing grafting compound in the resin molded body after molding and processing.

The depth of the functionalized area in the resin molded body according to the present invention is present preferably to the maximum depth of 10 mm, more preferably to the maximum depth of 500 µm, further preferably to the maximum depth of 200 µm, particularly preferably to the maximum depth of 50 µm, and further more preferably to the maximum depth of 20 µm.

The depth to which the graft chain is present can be a depth of 0.001 to 99%, for example, a depth of 0.01 to 99% or a depth of 0.1 to 99% of the thickness of the resin molded body from the surface of the resin molded body. The depth to which the graft chain is present may be preferably a depth of 2 to 90%, more preferably 5 to 80%, and further more preferably a depth of 10 to 60% from the surface of the resin molded body.

The depth to which the graft chain is present in the molding material (preferably, the resin material after graft polymerization) may be measured through EDX (energy dispersive X-ray) analysis by a scanning electron microscope (SEM), EPMA (electron probe microanalyzer) analysis, EDX by a scanning transmission electron microscope (STEM) or the like on a cross section of the molding material after surface graft polymerization. In addition, the depth to which the graft chain is present may also be measured through microscopic FT-IR, a Raman microscope or the like.

In addition, the depth to which the graft chain is present in the molding material (preferably, the resin material after graft polymerization) can also be measured through positron lifetime measurement. The positron lifetime can be obtained by measuring a time from generation of a positron to its pair annihilation with an electron. The positron lifetime correlates with the amorphous free volume of the polymer and the size of atomic vacancies in the crystal, and thus, the more graft chains are grafted, the smaller the amorphous free volume in the molding material becomes and the shorter the positron lifetime becomes. From the above, the positron lifetime measurement can measure the depth to which the graft chain is present. Positron lifetime measurement is generally conducted by detecting gamma-ray and annihilation gamma-ray that are released upon β+ decay with different scintillation detectors, and calculating the frequency of annihilating positrons during a certain time period from the difference between their incident times. By analyzing the curve of extinction thus obtained, the positron lifetime can be determined. For example, "Free volume study of the functionalized fluorinated polymer" presented by T. Oka et. al. in The 2nd Japan-China Joint Workshop on Positron Science (JWPS2013) introduces an example in which styrene is grafted to a fluororesin. In the present invention, the presence of the graft chain can be measured with this method.

The degree of grafting of the molding material after the grafting reaction is preferably 1000% or less, more preferably 500% or less, further preferably 200% or less, further more preferably 150% or less, particularly preferably 100% or less, more preferably 75% or less, further preferably 50% or less, further more preferably 20% or less, and particularly preferably 10% or less. The degree of grafting of the molding material after the grafting reaction is preferably 0.001% or more, more preferably 0.01% or more, further preferably 0.05% or more, further more preferably 0.1% or more, and particularly preferably 0.2% or more.

In another embodiment, the degree of grafting is 2% or more.

When the degree of grafting becomes higher, desired functionalities expressed in a resin molded body obtained through molding and processing can be improved. On the other hand, when the thickness of the graft chain becomes lower or when the degree of grafting becomes lower, the strength of the molding material and a resin molded body obtained through molding and processing may be improved.

By controlling the degree of grafting, the functionalized area in the obtained resin molded body may be controlled.

The "degree of grafting" means the proportion of the graft chain introduced into the resin material. In particular, the degree of grafting (Dg) may be calculated by measuring the weight change of the resin material between before and after the graft polymerization reaction and by using the following formula:

Degree of grafting: $Dg \, [\%] = (W_1 - W_0)/W_0 \times 100$ wherein $W_0$ is the weight of the resin material before the graft polymerization and $W_1$ is the weight of the resin material after the graft polymerization.

In addition, the above-described degree of grafting may also be calculated with thermogravimetric analysis (TG). In particular, according to a certain program, the temperature of the molding material having the graft chain is altered (heated or cooled) and the weight change of the molding material is measured. The degree of grafting can be calculated from this weight change. Thermogravimetric analysis can be carried out using, for example, a TGA measuring device from Rigaku Corporation or Shimadzu Corporation.

The mass ratio between constituent units derived from the fluorine-containing compound and constituent units derived from the non-fluorinated compound in the graft chain is preferably within the range of 99.9:0.1 to 0.1:99.9, and more preferably within the range of 70:30 to 30:70. Note that analysis of this mass ratio can be carried out using a combustion flask method.

In one embodiment, the mass ratio between constituent units derived from the fluorine-containing compound and constituent units derived from the non-fluorinated compound in the graft chain is preferably within the range of, 25:75 to 0.1:99.9, more preferably within the range of 20:80 to 1:99, and further preferably within the range of 20:80 to 2:98.

In one embodiment, the mass ratio between constituent units derived from the fluorine-containing compound and constituent units derived from the non-fluorinated compound in the graft chain is preferably within the range of, 10:90 to 0.1:99.9, more preferably within the range of 9:91 to 1:99, and further preferably within the range of 8:92 to 2:98.

Since the graft chain has constituent units derived from the fluorine-containing compound and constituent units derived from the non-fluorinated compound, when a molding material having this graft chain is used, its intermolecular miscibility with an additive composed of a fluorine-containing compound polymer such as a fluorine-containing kneaded repellent agent and a fluorine-containing water- and oil-repellent agent, or with another resin material such as a material composed of a fluororesin or a material composed of a non-fluorinated resin is improved, thereby facilitating mixing. Furthermore, in a resin molded body formed by using a material obtained through the mixing as described above, bleedout and cloudiness are unlikely to occur.

Examples of the method for introducing the graft chain into the resin material include, for example, a method in which the resin material is treated with radiation, and the resin material is then subjected to a chemical reaction with the fluorine-containing compound (optionally including a low molecular weight component such as monomer, dimer and oligomer) and/or the non-fluorinated compound (optionally including a low molecular weight component such as monomer, dimer and oligomer), or with a composition (optionally including a low molecular weight component such as monomer, dimer and oligomer) including the fluorine-containing compound and/or the non-fluorinated compound.

By irradiating the resin material with radiation, in the resin material, a hydrogen atom or a fluorine atom is desorbed from the compound constituting the resin material, or alternatively, the backbone and/or a side chain of the compound constituting the resin material is cleaved through radiation chemical reaction, thereby producing intermediate active species such as radicals. These intermediate active species such as radicals are graft-polymerized with a compound that imparts functions to the resin material, and the graft chain is introduced into the resin material.

The above-described fluorine-containing compound indicates a fluorine-containing compound that may impart functions to the resin material. Such a fluorine-containing compound is not limited as long as it can be graft-polymerized to the resin material along with the non-fluorinated compound to form a graft chain and can impart desired functions to the resin material. Examples thereof include, for example, a compound having a moiety containing a fluorine atom and a moiety reactive with intermediate active species.

In one embodiment, the fluorine-containing compound may be a compound having a perfluoropolyether group or a perfluoroalkyl group and a group reactive with intermediate active species such as radicals (hereinafter, may be referred to as a "group A reactive with intermediate active species").

The above-described fluorine-containing compound may have two or more perfluoropolyether groups or perfluoroalkyl groups, and group A's reactive with intermediate active species.

The above-described perfluoroalkyl group is a group represented by $C_jF_{2j+1}$, wherein j is an integer of 1 to 30, preferably an integer of 3 to 20 such as an integer of 5 to 10. The perfluoroalkyl group may be linear or branched, but it is preferably linear.

In one embodiment, the above-described perfluoroalkyl group is a linear perfluoroalkyl group having 1 to 10 carbon atoms. In particular, $Rf$ is represented by $F—(CF_2)_n$—, wherein n is an integer of 1 to 10, and more preferably, n is an integer of 4 to 8 such as 6.

The above-described perfluoropolyether group (hereinafter, may also be referred to as "PFPE") is a group represented by the following formula:

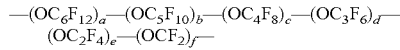

wherein a, b, c, d, e and f are each independently an integer of 0 or more and 200 or less, and the sum of a, b, c, d, e and f is at least 1. Preferably, a, b, c, d, e and f are each independently an integer of 0 or more and 100 or less. The sum of a, b, c, d, e and f is preferably 5 or more and more preferably 10 or more. The sum of a, b, c, d, e and f is preferably 200 or less and more preferably 100 or less. For example, it is 10 or more and 200 or less, and more specifically 10 or more and 100 or less. In addition, the occurrence order of respective repeating unit, which is shown in parenthesis subscripted with a, b, c, d, e or f, is not limited in the formula.

These repeating units may be linear or branched, but they are preferably linear. For example, —$(OC_6F_{12})$— may be —$(OCF_2CF_2CF_2CF_2CF_2CF_2)$—, —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$— or the like, but it is preferably —$(OCF_2CF_2CF_2CF_2CF_2CF_2)$—. —$(OC_5F_{10})$— may be —$(OCF_2CF_2CF_2CF_2CF_2)$—, —$(OCF(CF_3)CF_2CF_2CF_2)$—, —$(OCF_2CF(CF_3)CF_2CF_2)$—, —$(OCF_2CF_2CF(CF_3)CF_2)$—, —$(OCF_2CF_2CF_2CF(CF_3))$— or the like, but it is preferably —$(OCF_2CF_2CF_2CF_2CF_2)$—. —$(OC_4F_8)$— may be any of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—, but it is preferably —$(OCF_2CF_2CF_2CF_2)$—. —$(OC_3F_6)$— may be any of —$(OCF_2CF_2CF_2)$—, —$(OCF(CF_3)CF_2)$— and —$(OCF_2CF(CF_3))$—, but it is preferably —$(OCF_2CF_2CF_2)$—. In addition, —$(OC_2F_4)$— may be any of —$(OCF_2CF_2)$— and —$(OCF(CF_3))$—, but it is preferably —$(OCF_2CF_2)$—.

In one embodiment, the above-described PFPE is —$(OC_3F_6)_d$—, wherein d is an integer of 1 or more and 200 or less, preferably 5 or more and 200 or less, and more preferably 10 or more and 200 or less. Preferably, PFPE is —$(OCF_2CF_2CF_2)_d$—, wherein d is an integer of 1 or more and 200 or less, preferably 5 or more and 200 or less, and more preferably 10 or more and 200 or less, or —$(OCF(CF_3)CF_2)_d$—, wherein d is an integer of 1 or more and 200 or less, preferably 5 or more and 200 or less, and more preferably 10 or more and 200 or less. More preferably, PFPE is —$(OCF_2CF_2CF_2)_d$—, wherein d is an integer of 1 or more and 200 or less, preferably 5 or more and 200 or less, and more preferably 10 or more and 200 or less.

In another embodiment, PFPE is —$(OC_4F_8)_c$—$(OC_3F_6)_d$—$(OC_2F_4)_e$—$(OCF_2)_f$—, wherein: c and d are each independently an integer of 0 or more and 30 or less; e and f are each independently an integer of 1 or more and 200 or less, preferably 5 or more and 200 or less, and more preferably 10 or more and 200 or less; the sum of c, d, e and f is preferably 10 or more and 200 or less; and the occurrence order of each repeating unit, which is shown in parenthesis subscripted with c, d, e or f, is not limited in the formula. Preferably, PFPE is —$(OCF_2CF_2CF_2CF_2)_c$—$(OCF_2CF_2CF_2)_d$—$(OCF_2CF_2)_e$—$(OCF_2)_f$—. In one embodiment, PFPE may be —$(OC_2F_4)_e$—$(OCF_2)_f$—, wherein e and f are each independently an integer of 1 or more and 200 or less, preferably 5 or more and 200 or less, and more preferably 10 or more and 200 or less, and the occurrence order of respective repeating unit, which is shown in parenthesis subscripted with e or f, is not limited in the formula.

In still another embodiment, PFPE is a group represented by —$(R^{41}-R^{42})_k$—, wherein $R^{41}$ is $OCF_2$ or $OC_2F_4$, and preferably $OC_2F_4$; and $R^{42}$ is a group selected from $OC_2F_4$, $OC_3F_6$, $OC_4F_8$, $OC_5F_{10}$ and $OC_6F_{12}$, or alternatively a combination of two or three groups independently selected from these groups. Preferably, $R^{42}$ is a group selected from $OC_2F_4$, $OC_3F_6$ and $OC_4F_8$, or alternatively a combination of two or three groups independently selected from these groups. Examples of the combination of two or three groups independently selected from $OC_2F_4$, $OC_3F_6$ and $OC_4F_8$ are not limited, but include —$OC_2F_4OC_3F_6$—, —$OC_2F_4OC_4F_8$—, —$OC_3F_6OC_2F_4$—, —$OC_3F_6OC_3F$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, —$OC_4F_8OC_2F_4OC_2F_4$— and the like. The above-described k is an integer of 2 to 100, and preferably an integer of 2 to 50. In the above-described formula, $OC_2F_4$, $OC_3F_6$, $OC_4F_8$, $OC_5F_{10}$ and $OC_6F_{12}$ may be either linear or branched, and they are preferably linear. In this embodiment, PFPE is preferably —$(OC_2F_4$—$OC_3F_6)_k$— or —$(OC_2F_4$—$OC_4F_8)_k$—.

In one embodiment, PFPE may be a group having a $((\alpha\beta)_i)$ chain composed of two or more linking $(\alpha\beta)$ units, wherein the $(\alpha\beta)$ unit has one to three $(\alpha)$ groups composed of at least one of oxyperfluoroalkylene groups having 1 to 2 carbon atoms and one to three $(\beta)$ groups composed of at least one of oxyperfluoroalkylene groups having 3 to 6 carbon atoms.

The above-described compound may have another oxyperfluoroalkylene group not belonging to the $((\alpha\beta)_i)$ chain.

The order of $(\alpha)$ groups and $(\beta)$ groups in the $(\alpha\beta)$ unit is not limited. For example, when two $(\alpha)$ groups are present, these two $(\alpha)$ groups may be directly bonded or may be bonded via at least one $(\beta)$ group.

The above-described PFPE may have a $((\alpha\beta)_i)$ chain composed of two or more linking $(\alpha\beta)$ units. When one end of the unit $(\alpha\beta)$ is the $(\alpha)$ group and the other end is the $(\beta)$ group, in the $((\alpha\beta)_i)$ chain, it is preferable that two or more $(\alpha\beta)$ units be linked in a way such that the $(\alpha)$ group and the $(\beta)$ group are arranged alternately between units. That is, it is preferable that adjoining $(\alpha\beta)$ units be bonded to form a head-to-tail structure. In the $(\alpha\beta)$ unit, the bonding order of $(\alpha)$ groups and $(\beta)$ groups is not limited. That is, $(\alpha)$ groups and $(\beta)$ groups may be arranged randomly, $(\alpha)$ groups and $(\beta)$ groups may be arranged alternately, or two or more blocks composed of a plurality of groups may be linked.

Examples of the $(\alpha\beta)$ unit include the following:
$(CF_2CF_2O—CF_2CF_2CF_2O)$,
$(CF_2CF_2O—CF_2CF_2CF_2CF_2O)$,
$(CF_2CF_2O—CF_2CF_2CF_2OCF_2CF_2CF_2O)$,
$(CF_2CF_2O—CF_2CF(CF_3) OCF_2CF_2CF_2O)$,
$(CF_2CF_2O—CF_2CF_2CF_2CF_2OCF(CF_3)CF_2O)$.

In particular, a preferable embodiment of the above-described PFPE is represented by formula (1) below:

$$Rf^7—O—[(Rf^1O)_{x1}(Rf^2O)_{x2}(Rf^3O)_{x3}(Rf^4O)_{x4}(Rf^5O)_{x5}(Rf^6O)_{x6}]_f—B \quad (1)$$

wherein the symbols in formula (1) are as follows:
i is an integer of 1 or more, and preferably an integer of 2 or more. The upper limit of i is preferably 45. i is preferably 4 to 40 and particularly preferably 5 to 35;
x1 to x2 are each independently an integer of 0 to 3, and x1+x2 is an integer of 1 to 3; x3 to x6 are each independently an integer of 0 to 3, and x3+x4+x5+x6 is an integer of 1 to 3;
$Rf^1$ is a perfluoroalkylene group having 1 carbon atom;
$Rf^2$ is a perfluoroalkylene group having 2 carbon atoms;
$Rf^3$ is a perfluoroalkylene group having 3 carbon atoms;
$Rf^4$ is a perfluoroalkylene group having 4 carbon atoms;
$Rf^5$ is a perfluoroalkylene group having 5 carbon atoms;
$Rf^6$ is a perfluoroalkylene group having 6 carbon atoms; and
$Rf^7$ is a perfluoroalkyl group having 1 to 6 carbon atoms or a perfluoroalkyl group having an ethereal oxygen atom and 2 to 6 carbon atoms.

Examples of the above described group A reactive with intermediate active species are not limited, but include, for example, a group having an ethylenic double bond and an oxygen-containing cyclic group (such as a glycidyl group and an oxetanyl group), as well as derivatives thereof.

The group A reactive with intermediate active species is preferably a group represented by the following formula:

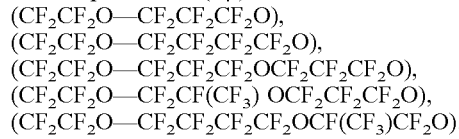

wherein
$R^b$ is a single bond, —O—, —CO— or —OC(O)—;
$R^c$ represents a hydrogen atom, a fluorine atom, or an alkyl group having 1 to 10 carbon atoms (preferably an alkyl group having 1 to 3 carbon atoms, and more preferably a methyl group), a lactam group (preferably a β-lactam, γ-lactam or δ-lactam group, and more preferably a γ-lactam group) or a phenyl group where the alkyl group, the lactam group and the phenyl group are optionally substituted with a fluorine atom, and is preferably a methyl group or a hydrogen atom;
$R^e$ each independently represents a hydrogen atom or a fluorine atom, and is preferably a hydrogen atom;
$R^d$ each independently represents a hydrogen atom, a fluorine atom, or an alkyl group having 1 to 10 carbon atoms (preferably an alkyl group having 1 to 3 carbon atoms, and more preferably a methyl group) or a phenyl group where the alkyl group and the phenyl group are optionally substituted with a fluorine atom, and is preferably a methyl group or a hydrogen atom and more preferably a hydrogen atom; and
n' is an integer of 1 to 5, preferably 1 or 2, and more preferably 1.

In the present embodiment, a preferable group A reactive with intermediate active species is a group represented by the following formula:

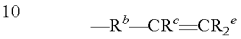

wherein
$R^b$ is a single bond or —OC(O)—;
$R^c$ represents a hydrogen atom, a fluorine atom, or an alkyl group having 1 to 10 carbon atoms (preferably an alkyl group having 1 to 3 carbon atoms, and more preferably a methyl group), a lactam group (preferably a β-lactam, γ-lactam or δ-lactam group, and more preferably a γ-lactam group) or a phenyl group where the alkyl group, the lactam group and the phenyl group are optionally substituted with a fluorine atom, and is preferably a methyl group or a hydrogen atom, and it preferably represents a hydrogen atom, a fluorine atom, or an alkyl group having 1 to 10 carbon atoms (preferably an alkyl group having 1 to 3 carbon atoms, and more preferably a methyl group) or a phenyl group where the alkyl group and the phenyl group are optionally substituted with a fluorine atom, and is more preferably a methyl group or a hydrogen atom; and
$R^e$ has the same meaning as that described above.

A more preferable group A reactive with intermediate active species is a group represented by the following formula:

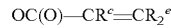

wherein $R^c$ and $R^e$ have the same meaning as that described above.

A further preferable group A reactive with intermediate active species is an acryloyl group or a methacryloyl group.

Examples of the fluorine-containing compound are not limited, but include, for example, at least one compound represented by any of the following formulae (A1), (A2), (B1), (B2), (C1), (D1) and (E1):

Rf-PFPE-X—$R^1$     (A1)

$R^1$—X-PFPE-X—$R^1$     (A2)

Rf-PFPE-$R^2$—$R^3$—$(R^4)_{n1}$—$R^5$—$R^6$     (B1)

$R^6$—$R^5$—$(R^4)_{n1}$—$R^3$—$R^2$-PFPE-$R^2$—$R^3$—$(R^4)_{n1}$—$R^5$—$R^6$     (B2)

$R^7(Rf\text{-}PFPE\text{-}R^2)_{n2}(R^8—R^1)$     (C1)

$R^7(Rf\text{-}PFPE\text{-}R^2)_{n2}(R^9(R^1)_{n4})_{n3}$     (D1)

$R^7(Rf\text{-}PFPE\text{-}R^2)_{n5}(R^{11})_{n6}(R^{12})_{n7}$     (E1)

wherein
Rf each independently represents an alkyl group having 1 to 16 carbon atoms optionally substituted with one or more fluorine atoms;
PFPE has the same meaning as that described above;
$R^1$ each independently represents the group A reactive with intermediate active species;
X represents a divalent organic group;
$R^2$ is a group represented by the following formula:

-$(Q)_e$-$(CFZ)_f$—$(CH_2)_g$— wherein: Q, each independently for each occurrence, represents an oxygen atom, phenylene, carbazolylene, —NR$^a$— where R$^a$ represents a hydrogen atom or an organic group, or a divalent polar group; Z, each independently for each occurrence, represents a hydrogen atom, a fluorine atom or a lower fluoroalkyl group; e, f and g are each independently an integer of 0 or more and 50 or less; the sum of e, f and g is at least 1; and the occurrence order of each repeating unit, which is shown in parenthesis, is not limited in the formula;

R$^3$ each independently represents a divalent organic group;

R$^4$, each independently for each occurrence, represents R$^{4a}$ or R$^{4b}$, provided that at least one R$^4$ is R$^{4a}$;

R$^{4a}$, each independently for each occurrence, represents a divalent organic group having a group reactive with intermediate active species;

R$^{4b}$, each independently for each occurrence, represents a divalent organic group not having a group reactive with intermediate active species;

n1 is each independently an integer of 1 or more and 50 or less;

R$^5$ each independently represents —O—, —S—, —NH— or a single bond;

R$^6$ each independently represents a monovalent organic group or a hydrogen atom;

R$^7$ represents an organic group having a valence of (n2+n3) or (n5+n6+n7) that optionally has a ring structure, a heteroatom and/or a functional group;

R$^8$ represents a divalent organic group;

n2 is an integer of 1 or more and 3 or less;

n3 is an integer of 1 or more and 3 or less;

R$^9$ represents an organic group having a valence of 3 to 8;

n4 is an integer of 2 or more and 7 or less;

R$^{11}$ is —R$^8$—R$^1$ or —R$^9$(R$^1$)$_{n4}$;

R$^{12}$ is a group containing Si;

n5 is an integer of 1 or more and 3 or less;

n6 is an integer of 1 or more and 3 or less; and n7 is an integer of 1 or more and 3 or less.

When used in the present specification, the "monovalent organic group" and the "divalent organic group" mean monovalent and divalent groups containing carbon, respectively.

In the above-described formulae (A1) and (A2), R$^1$ each independently represents a group reactive with intermediate active species such as radicals.

R$^1$ is preferably a group represented by the following formula:

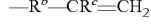
—R$^b$—CR$^c$═CH$_2$ wherein

R$^b$ is a single bond, —O—, —CO— or —OC(O)—; and

R$^c$ represents a hydrogen atom, a fluorine atom, or an alkyl group having 1 to 10 carbon atoms (preferably an alkyl group having 1 to 3 carbon atoms, and more preferably a methyl group), a lactam group (preferably a β-lactam, γ-lactam or δ-lactam group, and more preferably a γ-lactam group) or a phenyl group where the alkyl group, the lactam group and the phenyl group are optionally substituted with a fluorine atom, and is preferably a methyl group or a hydrogen atom.

A more preferable group reactive with intermediate active species such as radicals is a group represented by the following formula:

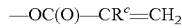
—OC(O)—CR$^c$═CH$_2$ wherein R$^c$ has the same meaning as that described above.

Further preferably, R$^1$ is an acryloyl group or a methacryloyl group.

In the above-described formulae (A1), (B1), (C1), (D1) and (E1), Rf represents an alkyl group having 1 to 16 carbon atoms optionally substituted with one or more fluorine atoms.

In the above-described alkyl group having 1 to 16 carbon atoms optionally substituted with one or more fluorine atoms, the "alkyl group having 1 to 16 carbon atoms" may be linear or branched, and it is preferably a linear or branched alkyl group having 1 to 6 carbon atoms, particularly 1 to 3 carbon atoms, and more preferably a linear alkyl group having 1 to 3 carbon atoms.

In addition, Rf is preferably an alkyl group having 1 to 16 carbon atoms substituted with one or more fluorine atoms, more preferably a CF$_2$H—C$_{1-15}$ perfluoroalkylene group, further preferably perfluoroalkyl group having 1 to 16 carbon atoms, and further more preferably a perfluoroalkyl group having 1 to 6 carbon atoms, particularly 1 to 3 carbon atoms.

In the above-described formulae (A1) and (A2), X each independently represents a divalent organic group. The X group is understood as a linker linking PFPE and R$^1$. Accordingly, the X group may be any divalent organic group as long as a compound represented by the above-described formulae (A1) and (A2) can be stably exist.

Examples of the above-described X are not limited, but it is preferably, for example, a group represented by the following formula:

(CFZ)$_x$—(CH$_2$)$_y$—(Y)$_z$— wherein

Z represents a fluorine atom, or a perfluoroalkyl group having 1 to 3 carbon atoms or a derivative group thereof;

Y represents —OCO—, —OCONH— or —CONH—, or an organic group containing one of them;

x, y and z are each independently an integer of 0 to 3; and the occurrence order of each repeating unit, which is shown in parenthesis subscripted with x, y or z, is not limited in the formula.

Specific examples of the above-described X include, for example:

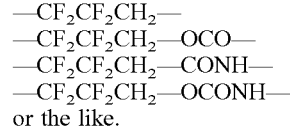
—CF$_2$CF$_2$CH$_2$—
—CF$_2$CF$_2$CH$_2$—OCO—
—CF$_2$CF$_2$CH$_2$—CONH—
—CF$_2$CF$_2$CH$_2$—OCONH— or the like.

In the above-described formulae (B1) and (B2), R$^2$ is a group represented by the formula: -(Q)$_e$-(CFZ)$_f$—(CH$_2$)$_g$—, wherein: e, f and g are each independently an integer of 0 or more and 50 or less; the sum of e, f and g is at least 1; and the occurrence order of each repeating unit, which is shown in parenthesis, is not limited in the formula.

In the above-described formula, Q represents an oxygen atom, phenylene, carbazolylene, —NR$^a$— where R$^a$ represents a hydrogen atom or an organic group, or a divalent polar group, and it is preferably an oxygen atom or a divalent polar group, and more preferably an oxygen atom.

Examples of the "divalent polar group" in the above-described Q are not limited, but include —C(O)—, —C(═NR$^h$)— and —C(O)NR$^h$—, wherein R$^h$ represents a hydrogen atom or a lower alkyl group. The "lower alkyl group" is, for example, an alkyl group having 1 to 6 carbon atoms, such as methyl, ethyl or n-propyl, and these may be substituted with one or more fluorine atoms.

In the above-described formula, Z represents a hydrogen atom, a fluorine atom or a lower fluoroalkyl group, and is preferably a fluorine atom.

The above-described "lower fluoroalkyl group" is, for example, a fluoroalkyl group having 1 to 6 carbon atoms, preferably 1 to 3 carbon atoms, preferably a perfluoroalkyl group having 1 to 3 carbon atoms, more preferably a trifluoromethyl group or a pentafluoroethyl group, and further preferably a trifluoromethyl group.

$R^2$ is preferably a group represented by the formula: $-(O)_e-(CF_2)_f-(CH_2)_g-$, wherein e, f and g have the same meaning as that described above, and the occurrence order of each repeating unit, which is shown in parenthesis, is not limited in the formula.

Examples of the group represented by the above-described formula: $-(O)_e-(CF_2)_f-(CH_2)_g-$ include, for example, a group represented by $-(O)_{e'}-(CF_2)_{f'}-(CH_2)_{g'}-O-[(CH_2)_{g''}-O-]_{g'''}$, wherein e' is 0 or 1, f', g' and g'' are each independently an integer of 1 to 10, and g''' is 0 or 1.

In the above-described formulae (B1) and (B2), $R^3$ represents a divalent organic group.

The $R^3$ group is preferably $-C(R^{3a})(R^{3b})-$, wherein $R^{3a}$ and $R^{3b}$ each independently represent a hydrogen atom or an alkyl group, and either $R^{3a}$ or $R^{3b}$ is preferably an alkyl group.

In the above-described formulae (B1) and (B2), $R^4$, each independently for each occurrence, represents $R^{4a}$ or $R^{4b}$, provided that at least one $R^4$ is $R^{4a}$.

The above-described $R^{4a}$, each independently for each occurrence, represents a divalent organic group having a group reactive with intermediate active species such as radicals.

$R^{4a}$ is preferably a group represented by the following formula:

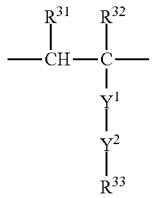

In the above-described formula, $R^{31}$, each independently for each occurrence, represents a hydrogen atom or an alkyl group. Such $R^{31}$ is preferably a hydrogen atom.

In the above-described formula, $R^{32}$, each independently for each occurrence, represents a hydrogen atom or an alkyl group. Such $R^{32}$ is preferably a methyl group or a hydrogen atom, and is more preferably a hydrogen atom.

In the above-described formula, $R^{33}$, each independently for each occurrence, represents an organic group having a group reactive with intermediate active species such as radicals.

Examples of the group reactive with intermediate active species such as radicals include those equivalent to the above-described ones, but it is preferably $CH_2=CX^1-C(O)-$, wherein $X^1$ represents a hydrogen atom, a halogen atom such as a chlorine atom, a fluorine atom, or an alkyl group having 1 to 10 carbon atoms optionally substituted with fluorine, and specific examples thereof include $CH_2=C(CH_3)-C(O)-$ or $CH_2=CH-C(O)-$.

In the above-described formula, $Y^1$ represents $-O-$, $-N(R^f)-$, phenylene or carbazolylene, wherein $R^f$ represents an organic group, and is preferably an alkyl group.

$Y^1$ is preferably $-O-$, phenylene or carbazolylene, more preferably $-O-$ or phenylene, and further preferably $-O-$.

In the above-described formula, $Y^2$ represents a linker whose backbone has 1 to 16 (more preferably 2 to 12, and further preferably 2 to 10) carbon atoms. Examples of the $Y^2$ are not limited, but include, for example, $-(CH_2-CH_2-O)_{p1}-$, wherein p1 represents an integer of 1 to 10, for example, an integer of 2 to 10, $-(CHR^g)_{p2}-O-$, wherein p2 is an integer of 1 to 40 and $R^g$ represents hydrogen or a methyl group, $-(CH_2-CH_2-O)_{p3}-CO-NH-CH_2CH_2-O-$, wherein p3 represents an integer of 1 to 10, for example, an integer of 2 to 10, $-CH_2-CH_2-O-CH_2-CH_2-$, $-(CH_2)_{p4}-$, wherein p4 represents an integer of 1 to 6, $-(CH_2)_{p5}-O-CONH-(CH_2)_{p6}-$, wherein p5 represents an integer of 1 to 8, preferably 2 or 4 and p6 represents an integer of 1 to 6, preferably 3, or $-O-$, provided that $Y^1$ is not $-O-$. Preferable examples of $Y^2$ include $-(CH_2-CH_2-O)_{p1}-$, wherein p1 represents an integer of 1 to 10, for example, an integer of 2 to 10, or $-(CHR^d)_{p2}-O-$, wherein p2 is an integer of 1 to 40 and $R^d$ represents hydrogen or a methyl group, and specific examples thereof include $-(CH_2-CH_2-O)_2-$ or $-CH_2-CH_2-O-$. Note that, in these groups, the left end is bonded to the side of the molecular backbone (the side of $Y^1$) and the right end is bonded to the side of the group reactive with intermediate active species such as radicals (the side of $R^{33}$).

$R^{4a}$ is further preferably a group represented by the following formula:

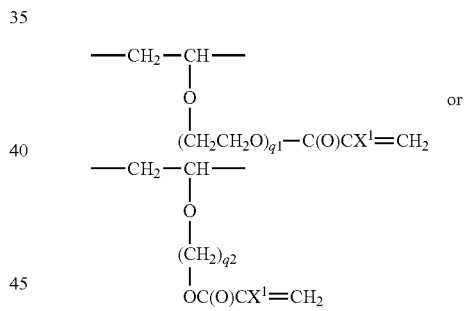

In the above-described formula, $X^1$ represents a hydrogen atom, a halogen atom such as a chlorine atom, a fluorine atom, or an alkyl group having 1 to 10 carbon atoms optionally substituted with fluorine, and is preferably a hydrogen atom or an alkyl group having 1 to 10 carbon atoms such as a methyl group. In the above-described formula, q1 is an integer of 1 to 10, and preferably an integer of 1 to 5 such as 1 or 2. q2 is an integer of 1 to 10, and preferably an integer of 1 to 5 such as 2.

The above-described $R^{4b}$, each independently for each occurrence, is a divalent organic group not having a group reactive with intermediate active species such as radicals.

$R^{4b}$ is preferably $-(CHR^{4c}-CR^{4d}R^{4e})_s-$, wherein: $R^{4c}$ and $R^{4d}$ each independently represent a hydrogen atom or an alkyl group; s is an integer of 0 to 50; and the $R^{4e}$ group is $-Q'-R^{4f}$ where Q' has the same meaning as the above-described Q, $R^{4f}$ is an organic group not having a group reactive with intermediate active species such as radicals, and is a group that a $R^{4g}$ group described later is bonded via a linker or directly to Q'.

The linker is preferably as follows:

(a) —(CH$_2$—CH$_2$—O)$_{s1}$—, wherein s1 represents an integer of 1 to 10, for example, an integer of 2 to 10;

(b) —(CHR$^{4h}$)$_{s2}$—O—, wherein s2 represents the number of repetitions, which is an integer of 1 to 40, and R$^{4h}$ represents hydrogen or a methyl group;

(c) —(CH$_2$—CH$_2$—O)$_{s1}$—CO—NH—CH$_2$—CH$_2$—O—, wherein s1 has the same meaning as that described above;

(d) —CH$_2$—CH$_2$—O—CH$_2$—CH$_2$—;

(e) —(CH$_2$)$_{s3}$—, wherein s3 represents an integer of 1 to 6; or (f) —(CH$_2$)$_{s4}$—O—CONH—(CH$_2$)$_{s5}$—, wherein s4 represents an integer of 1 to 8, preferably 2 or 4, and s5 represents an integer of 1 to 6, preferably 3; or (g) —O—, provided that Q' is not —O—.

R$^{4g}$ is preferably the following group:

(i) an alkyl group examples: methyl and ethyl;

(ii) a chain group containing an alkyl group substituted with fluorine examples:

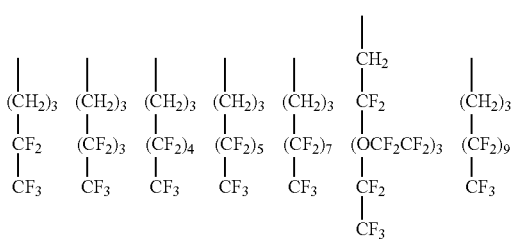

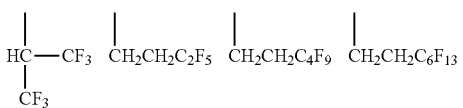

(iii) a group containing one or more cyclic moieties selected from the group consisting of a monocyclic carbocycle, a bicyclic carbocycle, a tricyclic carbocycle and a tetracyclic carbocycle examples:

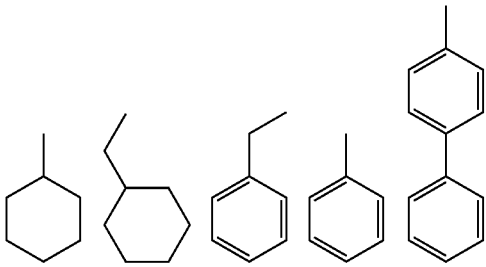

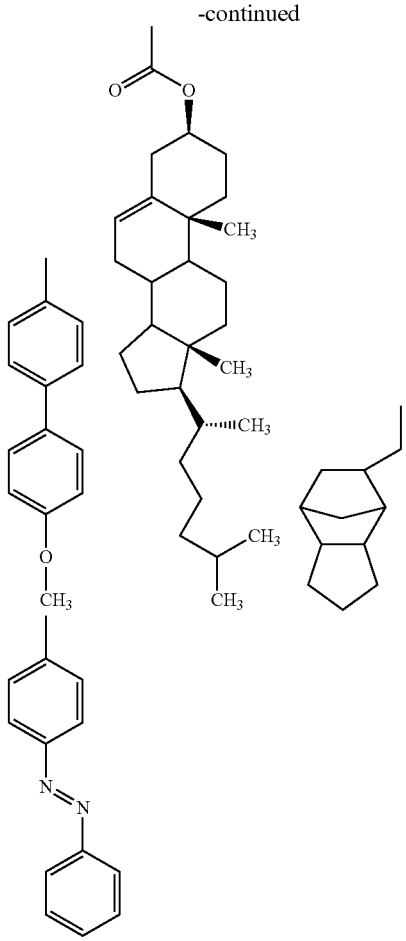

(iv) a group containing a hydrocarbon group substituted with one or more (preferably one or two) carboxy groups examples:

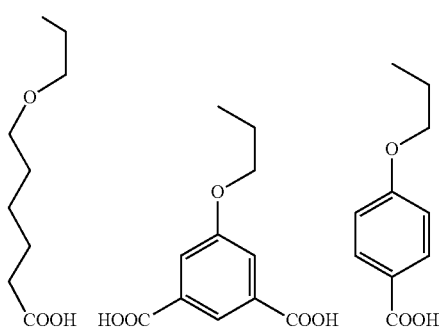

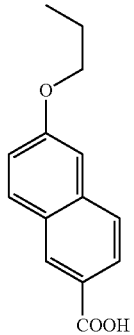

(v) a group containing one or more (preferably one) amino groups;
(vi) a hydrogen atom; or
(vii) a group containing an imidazolium salt
examples:

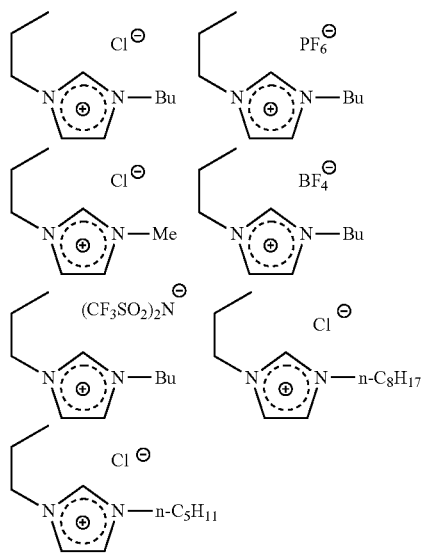

$R^{4g}$ is more preferably a hydrogen atom or an alkyl group that may be fluorinated and bonded via an ethylene chain; more preferably a hydrogen atom, a methoxyethyl group, an isobutyl group or $R^{3i}$—$CF_2$—$(CF_2)_{s6}$—$(CH_2)_{s7}$—O—$(CH_2)_2$—, wherein Rx is a fluorine atom or a hydrogen atom, s6 is an integer of 0 to 6, and s7 is an integer of 1 to 6; and further preferably a 3-(perfluoroethyl) propoxyethyl group [rational formula: $CF_3$—$(CF_2)$—$(CH_2)_3$—O—$(CH_2)_2$—].

In the above-described $R^4$, the structural unit $R^{4a}$ and the structural unit $R^{4b}$ may each form a block or may be bonded randomly.

In the above-described formulae (B1) and (B2), n1 is an integer of 1 or more and 100 or less, preferably an integer of 1 or more and 50 or less, and further preferably an integer of 2 or more and 30 or less.

In the above-described formulae (B1) and (B2), $R^5$ represents —O—, —S—, —NH— or a single bond, and is preferably —O—.

In the above-described formulae (B1) and (B2), $R^6$ represents a monovalent organic group or a hydrogen atom.

$R^6$ is preferably Rf-PFPE-$R^2$, wherein Rf, PFPE and $R^2$ have the same meaning as that described above, or an alkyl group having 1 to 10 carbon atoms optionally substituted with fluorine, more preferably an alkyl group having 1 to 6 carbon atoms, and further preferably methyl.

In the above-described formula (C1), $R^7$ represents an organic group having a valence of (n2+n3) that optionally has a ring structure, a heteroatom and/or a functional group.

In the above-described formula (C1), n2 is an integer of 1 or more and 3 or less.

In the above-described formula (C1), n3 is an integer of 1 or more and 3 or less.

Preferably, n2+n3 is 3, and for example, n2 is 1 and n3 is 2, or n2 is 2 and n3 is 1.

Examples of the "organic group having a valence of (n2+n3) that optionally has a ring structure, a heteroatom and/or a functional group" in the above-described $R^7$ include, for example, a group derivatized by, from a monovalent organic group, further removing (n2+n3−1) hydrogen atoms.

$R^7$ is preferably a group represented by the following formula:

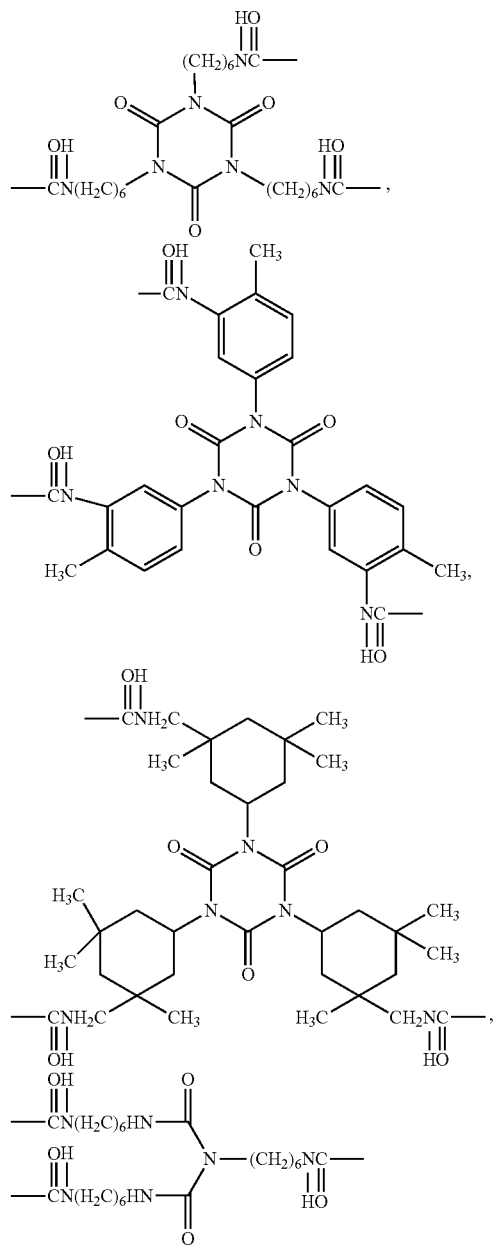

More preferably, $R^7$ is a group represented by the following formula:

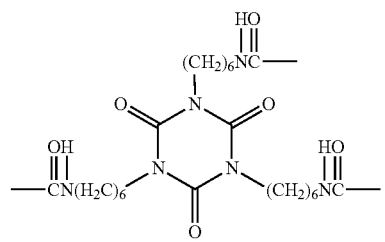

In the above-described formula (C1), $R^8$ represents a divalent organic group. Such $R^8$ is preferably —O—

$-(CH_2)_{r'}-$, wherein r is an integer of 1 or more and 10 or less, preferably an integer of 1 or more and 3 or less, or $-NH-(CH_2)_{r'}-$, wherein r has the same meaning as that described above, and is more preferably $-O-(CH_2)_{r'}-$, wherein r is an integer of 1 or more and 3 or less.

In one embodiment, compounds represented by the above-described formulae (B1) and (B2) may be at least one compound represented by the following general formulae (B1a) and (B2a), respectively:

$$\text{Rf}-\text{PFPE}-O-\underset{\underset{Z}{|}}{CF}(CF_2)_g-(CH_2)_h-O-R^3-(CH_2CH)_{n1}-O-R^6 \quad (B1a)$$
$$\underset{|}{O-C_2H_4-OC(O)CX^1=CH_2}$$

$$R^6-O-(CHCH_2)_{n1}-R^3-O-(CH_2)_h-(CF_2)_g\underset{\underset{Z}{|}}{CF}-\text{PFPE}-* \quad (B2a)$$
$$\underset{|}{O-C_2H_4-OC(O)CX^1=CH_2}$$

$$*O-\underset{\underset{Z}{|}}{CF}(CF_2)_g-(CH_2)_h-O-R^3-(CH_2CH)_{n1}-O-R^6$$
$$\underset{|}{O-C_2H_4-OC(O)CX^1=CH_2}$$

wherein

Rf, PFPE, $R^3$, $R^6$, $X^1$, Z and n1 have the same meaning as that described above;

g is 0 or 1;

h is 1 or 2; and q1 is an integer of 1 or more and 5 or less.

In another embodiment, a compound represented by the above-described formula (C1) is at least one compound obtained by the reaction between:

(a) a NCO group present in a triisocyanate formed by trimerizing a diisocyanate, and (b) an active hydrogen in at least one active hydrogen-containing compound represented by the following formula (a1), or formulae (a1) and (a2):

$$\text{Rf}-\text{PFPE}-O-\underset{\underset{Z}{|}}{CF}(CF_2)_g-(CH_2)_h-OH \quad (a1)$$

$$HO-(CH_2)_h-(CF_2)_g\underset{\underset{Z}{|}}{CF}-\text{PFPE}-O-\underset{\underset{Z}{|}}{CF}(CF_2)_g-(CH_2)_h-OH \quad (a2)$$

wherein

Rf, PFPE, Z, g and h have the same meaning as that described above;

and at least one active hydrogen-containing compound represented by the following formula (a3):

$$CH_2=CX^1C(O)O-R^{30}-OH \quad (a3)$$

wherein $X^1$ has the same meaning as that described above; and $R^{30}$ represents a divalent organic group.

In the formula (a3), $R^{30}$ is preferably $-(CH_2)_{r'}-$, wherein r' is an integer of 1 or more and 10 or less, preferably an integer of 1 or more and 3 or less, $-CH(CH_3)-$, $-CH(CH_2CH_3)-$ or $-CH(CH_2OC_6H_5)-$, and is more preferably $-(CH_2)_{r'}-$, wherein r' is an integer of 1 or more and 3 or less.

In the above-described formula (D1), $R^9$ represents an organic group having a valence of 3 to 8. As is evident from the formula (D1), such $R^9$ has a valence of (n4+1).

Specific examples of the above-described $R^9$ include, for example:

$-O-CH_2-C(CH_2-)_3$; or $-O-CH_2-C(CH_2-)_2-CH_2OCH_2-C(CH_2-)_3$.

In a preferable embodiment, examples of $R^9(R^1)_{n4}$ include:

$-O-CH_2-C(CH_2-OC(O)-CR^2=CH_2)_3$; or $-O-CH_2-C(CH_2-OC(O)-CR^2=CH_2)_2-CH_2OCH_2-C(CH_2-OC(O)-CR^2=CH_2)_3$.

In the above-described formula (D1), n2 is an integer of 1 or more and 3 or less.

In the above-described formula (D1), n3 is an integer of 1 or more and 3 or less.

In the above-described formula (D1), n4 is an integer of 2 or more and 7 or less, preferably 3 or more and 6 or less.

In the above-described formula (E1), $R^7$ has the same meaning as the above-described (C1). However, in the formula (E1), the valence of $R^7$ is (n5+n6+n7).

In the above-described formula (E1), $R^{11}$ is $-R^8-R^1$ or $-R^9(R^1)_{n4}$. These $-R^8-R^1$ and $-R^9(R')_{n4}$ groups have the same meaning as the formula (C1) and the formula (D1), respectively.

In the formula (E1), $R^{12}$ is a group containing Si.

The above-described group containing Si can preferably be at least one compound represented by the following formula:

$$R^{21}-O_{m1}-\underset{\underset{O_{m5}}{\underset{|}{\overset{O_{m5}}{\overset{|}{\overset{R^{22}}{|}}}}}}{Si}-(O-\underset{\underset{O_{m5}}{\underset{|}{\overset{O_{m5}}{\overset{|}{\overset{R^{24}}{|}}}}}}{Si})_{m2}-R^{26}-O_{m3}-(CH_2)_{m4}-O-$$
$$\underset{R^{23}}{} \quad \underset{R^{25}}{}$$

In the above-described formula, $R^{21}$, $R^{22}$, $R^{23}$, $R^{24}$ and $R^{25}$ are each independently an alkyl group or an aryl group.

Examples of the above-described alkyl group are not limited, but include an alkyl group having 1 to 10 carbon atoms and a cycloalkyl group having 3 to 20 carbon atoms, and it is preferably an alkyl group having 1 to 6 carbon atoms. Such alkyl group may be linear or branched, but it is preferably linear. A preferable specific example is a n-butyl group for $R^{21}$, and is a methyl group for $R^{22}$ to $R^{25}$.

Examples of the above-described aryl group are not limited, but include an aryl group having 6 to 20 carbon atoms. Such aryl group may contain 2 or more rings. A preferable aryl group is a phenyl group.

The above-described alkyl group and aryl group may contain a heteroatom such as a nitrogen atom, an oxygen atom and a sulfur atom in their molecular chain or ring, if desired.

Furthermore, the above-described alkyl group and aryl group may be substituted with one or more substituents selected from a halogen atom; and a $C_{1-6}$ alkyl group, a $C_{2-6}$ alkenyl group, a $C_{2-6}$ alkynyl group, a $C_{3-10}$ cycloalkyl group, an unsaturated $C_{3-10}$ cycloalkyl group, a 5 to 10-membered heterocyclyl group, an unsaturated 5 to 10-membered heterocyclyl group, a $C_{6-10}$ aryl group and a 5 to 10-membered heteroaryl group, all of which are optionally substituted with one or more halogen atoms.

In the above-described formula, $R^{26}$ represents a divalent organic group. Preferably, $R^{26}$ is —$(CH_2)_r$—, wherein r is an integer of 1 to 20, preferably an integer of 1 to 10.

In the above-described formula, m1 and m2 are each independently 0 or 1; m3 is an integer of 1 to 500, preferably 1 to 200, and more preferably an integer of 5 to 150; m4 is an integer of 0 to 20 such as an integer of 1 to 20; and m5 is 0 or 1.

Specific examples of the group indicated by the above-described formula include, for example, the following groups:

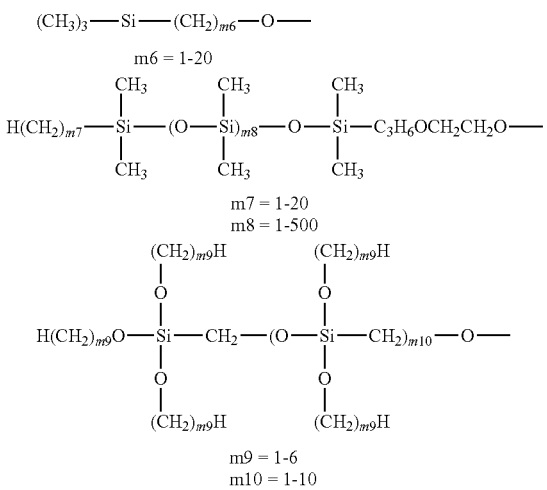

m6 = 1-20 m7 = 1-20
m8 = 1-500 m9 = 1-6
m10 = 1-10

In the above-described formula (E1), n5 is an integer of 1 or more and 3 or less.

In the above-described formula (E1), n6 is an integer of 1 or more and 3 or less.

In the above-described formula (E1), n7 is an integer of 1 or more and 3 or less.

Another example of the fluorine-containing compound is a compound represented by:

$$C_nF_{2n+1}—X—R^1$$

wherein
$R^1$ and X have the same meaning as that described above; and
n is an integer of 1 to 30, and preferably an integer of 3 to 20 such as an integer of 4 to 10.

Still another example of the fluorine-containing compound is a fluorine-containing acrylate ester indicated by the formula (I):

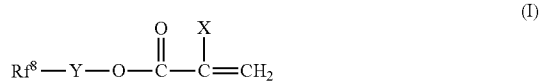

wherein
X is a hydrogen atom, a methyl group, a fluorine atom, a chlorine atom, a bromine atom, an iodine atom, a $CFX^1X^2$ group (provided that $X^1$ and $X^2$ are, independently of each other, a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group;

Y is an aliphatic group having 1 to 10 carbon atoms, an aromatic group or cycloaliphatic group having 6 to 10 carbon atoms, a —$CH_2CH_2N(R^1)SO_2$— group (provided that $R^1$ is an alkyl group having 1 to 4 carbon atoms), or a —$CH_2CH(OY^1)CH_2$— group (provided that $Y^1$ is a hydrogen atom or an acetyl group); and $Rf^8$ is a linear or branched fluoroalkyl group or fluoroalkenyl group having 1 to 6 carbon atoms.

In the fluorine-containing acrylate ester, X is preferably a hydrogen atom or a methyl group.

In the formula (I), the $Rf^8$ group is preferably a perfluoroalkyl group or a perfluoroalkenyl group. The number of carbons in the fluoroalkyl group or the fluoroalkenyl group is 1 to 6 such as 1 to 4.

Examples of the fluoroalkyl group include: —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, —$(CF_2)_5CF_3$, —$(CF_2)_3CF(CF_3)_2$ and the like.

Examples of the fluoroalkenyl group include: —$CF=CF_2$, —$CF_2CF=CF_2$, —$(CF_2)_2CF=CF_2$, —$CF_2C(CF_3)=CF_2$, —$CF(CF_3)CF=CF_2$, —$(CF_2)_3CF=CF_2$, —$C(CF_3)_2CF=CF_2$, —$(CF_2)_2C(CF_3)=CF_2$, —$(CF_2)_4CF=CF_2$, —$(CF_2)_4CF=CF_2$, —$(CF_2)_3C(CF_3)=CF_2$, and the like.

Y is an aliphatic group having 1 to 10 carbon atoms, an aromatic group or cycloaliphatic group having 6 to 10 carbon atoms, a —$CH_2CH_2N(R^1)SO_2$— group (provided that $R^1$ is an alkyl group having 1 to 4 carbon atoms), or a —$CH_2CH(OY^1)CH_2$— group (provided that $Y^1$ is a hydrogen atom or an acetyl group). The aliphatic group is preferably an alkylene group (in particular, that having 1 to 4 such as 1 or 2 carbon atoms). The aromatic group and the cycloaliphatic group may be either substituted or not substituted.

Examples of the fluorine-containing compound may include a fluorine-containing acrylate ester indicated by the formula:

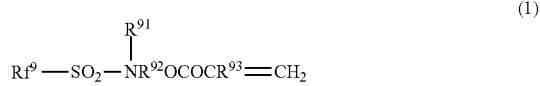

-continued $$Rf^9-CONR^{92}OCOCR^{93}=CH_3 \quad (3)$$

$$Rf^9-CH_2\overset{OH}{\underset{|}{C}}HCH_2OCOCR^{93}=CH_2 \quad (4)$$

$$Rf^9-CH_2\overset{OCOR^{93}}{\underset{|}{C}}HCH_2OCOCR^{93}=CH_2 \quad (5)$$

$$Rf^9-O-Ar-CH_2OCOCR^{93}=CH_2 \quad (6)$$

wherein $Rf^9$ represents a perfluoroalkyl group having 1 to 6 carbon atoms;

$R^{91}$ represents a hydrogen atom or an alkyl group having 1 to 10 carbon atoms;

$R^{92}$ represents an alkylene group having 1 to 10 carbon atoms;

$R^{93}$ represents a hydrogen atom or a methyl group;

Ar represents an aryl group optionally having a substituent; and n9 represents an integer of 1 to 10.

In one embodiment, in the above-described formulae (1) to (6), $Rf^9$ is preferably a perfluoroalkyl group having 1 to 10 carbon atoms;

$R^{91}$ is preferably a hydrogen atom or an alkyl group having 1 to 10 carbon atoms;

$R^{92}$ is preferably an alkylene group having 1 to 10 carbon atoms;

$R^{93}$ is preferably a hydrogen atom or a methyl group;

Ar is preferably an aryl group optionally having a substituent; and n9 is preferably an integer of 1 to 10.

Specific examples of the fluorine-containing compound may include:

$CF_3(CF_2)_5(CH_2)COCH=CH_2$,
$CF_3(CF_2)_5(CH_2)OCOC(CH_3)=CH_2$,
$CF_3(CF_2)_7(CH_2)OCOCH=CH_2$,
$CF_3(CF_2)_7(CH_2)OCOC(CH_3)=CH_2$,
$(CF_3)_2CF(CF_2)_3(CH_2)_2OCOCH=CH_2$,
$CF_3(CF_2)_3(CH_2)_2OCOC(CH_3)=CH_2$,
$CF_3(CF_2)_3(CH_2)_2OCOCH=CH_2$,
$CF_3(CF_2)_5(CH_2)_2OCOC(CH_3)=CH_2$,
$CF_3(CF_2)_5(CH_2)_2OCOCH=CH_2$,
$CF_3CF_2(CH_2)_2OCOCH=CH_2$,
$CF_3(CF_2)_3SO_2N(CH_3)(CH_2)_2OCOCH=CH_2$,
$CF_3(CF_2)_3SO_2N(C_2H_5)(CH_2)_2OCOC(CH_3)=CH_2$,
$(CF_3)_2CF(CF_2)_3CH_2CH_2C(OCOCH_3)CH_2OCOC(CH_3)=CH_2$,
$(CF_3)_2CF(CF_2)_3CH_2CH(OH)CH_2OCOCH=CH_2$.

In one embodiment, the fluorine-containing compound comprises a perfluoroalkyl group and a group A reactive with intermediate active species such as radicals.

In the present embodiment, the above-described fluorine-containing compound is preferably at least one selected from the group consisting of a compound represented by $Rf'CH=CH_2$, a perfluoroolefin, a dimer of a perfluoroolefin and an oligomer of a perfluoroolefin.

The above-described $Rf'$ is a perfluoroalkyl group, and preferably a linear perfluoroalkyl group having 1 to 10 carbon atoms. In particular, $Rf'$ is represented by $F-(CF_2)_n$, wherein n is an integer of 1 to 10, and more preferably, n is an integer of 4 to 8 such as 6.

Specific examples of the structure of the above-described compound represented by $Rf'CH=CH_2$ may include, for example, perfluorohexylethylene ($F(CF_2)_6CH=CH_2$).

Examples of a method for synthesizing the above-described compound represented by $Rf'CH=CH_2$ are not limited, but may include, for example, a method in which a halide represented by $Rf'CH_2CH_2Y^3$, wherein $Rf'$ has the same meaning as that described above and $Y^3$ is Br or I, and an alkaline metal salt of a carboxylic acid are heated in an alcohol solvent (for example, Japanese Patent Publication No. S39-18112). In the above-described method, the alcohol and the fluorine-containing compound according to the present embodiment can be separated through a so-called crystallization operation, focusing on the difference between the melting points of the alcohol and the fluorine-containing compound (for example, a method for separating an olefin-alcohol azeotrope described in Japanese Patent Laid-Open No. 2009-173588).

Examples of the above-described perfluoroolefin may include, for example, tetrafluoroethylene and hexafluoropropene.

Examples of the dimer of a perfluoroolefin or the oligomer of a perfluoroolefin may include, for example, an oligomer of tetrafluoroethylene, an oligomer of hexafluoropropylene and the like. The above-described oligomer of tetrafluoroethylene preferably has a degree of polymerization of 2 to 7, and the oligomer of hexafluoropropylene preferably has a degree of polymerization of 2 to 4. These oligomers are advantageous from the viewpoint where they can be applied to a variety of processing treatments. The oligomer of tetrafluoroethylene or the oligomer of hexafluoropropylene can be obtained by oligomerizing tetrafluoroethylene or hexafluoropropylene with a method described in, for example, U.S. Pat. No. 3,403,191 or 2,918,501.

The above-described oligomer may be a compound having highly branched molecular chains, composed of many isomers. The above-described oligomer may have, for example, a structure as described below:

dimer of hexafluoropropene:

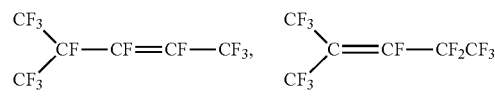

(cis or trans form)

trimer of hexafluoropropene:

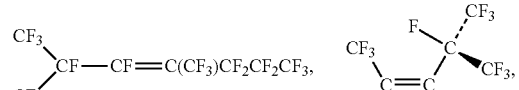

(cis or trans form)

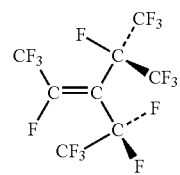
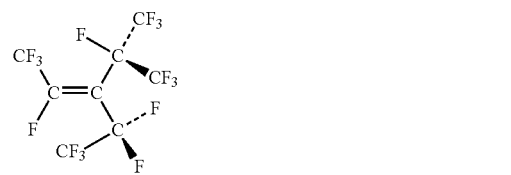

-continued tetramer of hexafluoropropene:

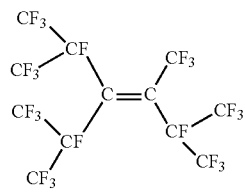

dimer of tetrafluoroethylene:

CF₃CF═CFCF₃ trimer of tetrafluoroethylene:

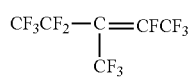

tetramer of tetrafluoroethylene:

CF₃CF₂—C(CF₃)═C(CF₃)—CF₂CF₃

(cis or trans form)

pentamer of tetrafluoroethylene:

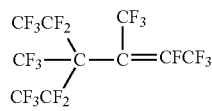

hexamer of tetrafluoroethylene:

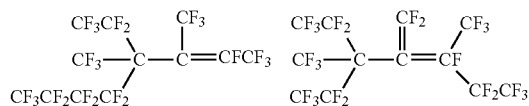

In one embodiment, the above-described fluorine-containing compound is a compound represented by Rf$^7$CH═CH$_2$.

In one embodiment, the above-described fluorine-containing compound is at least one selected from the group consisting of a perfluoroolefin, a dimer of a perfluoroolefin and an oligomer of a perfluoroolefin.

In another embodiment, the fluorine-containing compound can be a compound formed by substituting a part of or all hydrogen atoms of a hydrocarbon having an ethylenic double bond with fluorine atoms.

Examples of the above-described compound formed by substituting a part of or all hydrogen atoms of a hydrocarbon having an ethylenic double bond with fluorine atoms may include, for example, a reactive olefinic monomer with an ethylenic double bond, specifically ethylene, propylene, butylene and the like, containing a fluorinated alkyl group having 1 to 6 carbon atoms and not having an ester group, or a dimer thereof, The above-described compound is preferably a reactive olefinic monomer with an ethylenic double bond containing a perfluoroalkyl group having 1 to 6 carbon atoms and not having an ester group, specifically perfluoro-substituted ethylene, propylene, butylene and the like, or a dimer thereof, In a preferable embodiment, the compound formed by substituting a part of or all hydrogen atoms of a hydrocarbon having an ethylenic double bond with fluorine atoms can be tetrafluoroethylene, hexafluoropropylene, a dimer of hexafluoropropylene, or a reactive olefinic monomer with an ethylenic double bond containing a perfluoroalkyl group having 1 to 6 carbon atoms and not having an ester group.

In a preferable embodiment, the fluorine-containing compound comprises at least one selected from the group consisting of a fluorine-containing acrylate ester represented by the formula (I):

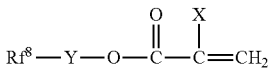

wherein X, Y and Rf$^8$ have the same meaning as that described above, a compound represented by Rf$^7$CH═CH$_2$, wherein Rf$^7$ is a perfluoroalkyl group, and a perfluoroolefin. Preferably, X is a hydrogen atom or a methyl group; Y is an aliphatic group having 1 to 10 carbon atoms, an aromatic group or cycloaliphatic group having 6 to 10 carbon atoms, a —CH$_2$CH$_2$N(R$^1$)SO$_2$— group (provided that R$^1$ is an alkyl group having 1 to 4 carbon atoms), or a —CH$_2$CH(OY$^1$)CH$_2$— group (provided that Y$^1$ is a hydrogen atom or an acetyl group); and the Rf$^8$ group is a perfluoroalkyl group or perfluoroalkenyl group having 1 to 6 carbon atoms, and more preferably 1 to 4 carbon atoms.

The above-described non-fluorinated compound indicates a non-fluorinated compound that may impart functions to the resin material. Such a non-fluorinated compound is not limited as long as it can be graft-polymerized to the resin material along with the fluorine-containing compound to form a graft chain containing constituent units derived from the non-fluorinated compound and can impart desired functions to the resin material.

The above-described non-fluorinated compound is a compound that can be graft-polymerized to the resin material (for example, to a reaction initiation point in the resin material produced by irradiation with radiation) to form the above-described graft chain containing constituent units derived from the non-fluorinated compound. The non-fluorinated compound is a compound whose constituent atoms do not contain any fluorine atom, and examples thereof may include, for example, a compound having a moiety reactive with radicals; a compound in which a part of the molecule or molecular chain is desorbed to ionize; or a compound having a moiety to be intermediate active species (for example, radical cations, radical anions or radicals) (hereinafter, may be referred to as a "moiety B reactive with intermediate active species"). For example, mention may be made of a compound having a moiety in which a hydrogen atom in the side chain is desorbed to become an alkyl radical or an allyl radical (such as (meth)acrylic monomers); a compound having a moiety in which a halogen atom in the side chain is desorbed through dissociating electron addition reaction to become an alkyl radical or an allyl radical (for example, vinyl monomers such as vinyl chloride); or the like.

By using the non-fluorinated compound together with the above-described fluorine-containing compound, the proportion of the graft chain introduced into the resin material (degree of grafting) can be improved through copolymerization reaction such as random copolymerization reaction (including cationic polymerization, anionic and radical polymerization) between the fluorine-containing compound and the non-fluorinated compound (hereinafter, may be referred to as a "grafting compound").

It is believed that this is because such a non-fluorinated compound contains many hydrogen atoms, which can generate intermediate active species such as radicals, and many radicals are generated by irradiation with radiation, in particular, ionizing radiation, and as a result, the fluorine-containing compound and the non-fluorinated compound can be introduced into the resin material more. By using the non-fluorinated compound together with the above-described fluorine-containing compound, not only the degree of grafting is improved, but also the water-repellency and oil-repellency, in particular, the oil-repellency of the surface of the resin molded body formed may be improved.

In addition, when the non-fluorinated compound is used, the water-repellency and oil-repellency, in particular, the oil-repellency of the surface of the resin molded body can be improved, compared to the case where the resin molded body has a graft chain only containing the fluorine-containing compound. It is believed that this is because, when the above-described non-fluorinated compound is used, the crystallinity of the graft chain after polymerization becomes higher, and even when an droplet is attached to the surface of the resin molded body, the graft chain has molecular cohesive force sufficient enough to repel the above-described droplet (for example, the gravitational force of the above-described droplet). In addition, it is believed that, when the above-described non-fluorinated compound is used, the crystallinity of the graft chain after polymerization, in particular, the crystallinity of constituent units derived from the non-fluorinated compound becomes higher, and constituent units derived from the fluorine compound bonded to constituent units derived from that non-fluorinated compound tend to be segregated on the surface of the resin molded body. The size of crystals on the surface of the resin molded body can be measured using X-ray diffraction (XRD).

Examples of the above described moiety B reactive with intermediate active species such as radicals are not limited, but include, for example, a group having an ethylenic double bond and an oxygen-containing cyclic group (such as a glycidyl group and a oxetanyl group), as well as derivatives thereof (hereinafter, may be referred to as a "group B reactive with intermediate active species").

The group B reactive with intermediate active species is preferably a group represented by the following formula:

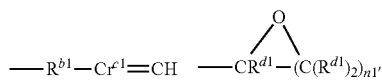

wherein $R^{b1}$ is a single bond, —O—, —CO— or —OC(O)—;

$R^{c1}$ represents a hydrogen atom, or an alkyl group having 1 to 10 carbon atoms (preferably an alkyl group having 1 to 3 carbon atoms, and more preferably a methyl group), a lactam group (preferably a β-lactam, γ-lactam or δ-lactam group, and more preferably a γ-lactam group) or a phenyl group, and is preferably a methyl group or a hydrogen atom;

$R^{d1}$ each independently represents a hydrogen atom, or an alkyl group having 1 to 10 carbon atoms (preferably an alkyl group having 1 to 3 carbon atoms, and more preferably a methyl group) or a phenyl group, and is preferably a methyl group or a hydrogen atom and more preferably a hydrogen atom; and n1' is an integer of 1 to 5, preferably 1 or 2, and more preferably 1.

The group B reactive with intermediate active species is preferably a group represented by the following formula:

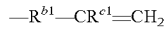

wherein $R^{b1}$ is a single bond or —OC(O)—; and $R^{c1}$ represents a hydrogen atom, or an alkyl group having 1 to 10 carbon atoms (preferably an alkyl group having 1 to 3 carbon atoms, and more preferably a methyl group) or a phenyl group, and is preferably a methyl group or a hydrogen atom.

A more preferable group B reactive with intermediate active species is a group represented by the following formula:

wherein $R^{c1}$ has the same meaning as that described above.

A further preferable group B reactive with intermediate active species is an acryloyl group or a methacryloyl group.

Examples of a compound having the group B reactive with intermediate active species may include, for example, (meth)acrylic monomers in which an alkyl group having 1 to 20 carbon atoms is bonded to the ester terminal; and vinyl monomers such as vinylnorbornene, styrene and vinyl chloride.

Examples of the compound having the group B reactive with intermediate active species may include, for example, (meth)acrylic monomers in which an alkyl group having 1 to 15 carbon atoms is bonded to the ester terminal, specifically, stearyl (meth)acrylate, isobornyl (meth)acrylate, cyclohexyl (meth)acrylate, (meth)acrylic acid, vinyl acetate, hydroxyethyl (meth)acrylate, hydroxypropyl (meth)acrylate, methyl (meth)acrylate, ethyl (meth)acrylate, butyl (meth)acrylate, ethylene glycol dimethacrylate, N,N-dimethylaminoethyl acrylate, decyl (meth)acrylate, dodecyl (meth)acrylate, dodecenyl (meth)acrylate, tetradecyl (meth)acrylate, tetradecenyl (meth)acrylate and the like; acrylamide, N,N-dimethyl acrylamide, N,N-dimethylaminopropyl acrylamide; vinyl monomers such as vinyl propionate, (meth)acrylonitrile, vinylnorbornene, styrene and vinyl chloride; and the like. Among these, it is preferable to use stearyl (meth)acrylate, styrene or vinylnorbornene, and further preferable to use stearyl acrylate or styrene from the viewpoint where the degree of grafting becomes more satisfactory.

From the viewpoint of further improving the degree of grafting, a polyfunctional (meth)acrylate may be used in combination with the above-described compound having the group B reactive with intermediate active species. Specific examples of the polyfunctional (meth)acrylate may include: 1,9-nonanediol di(meth)acrylate, 2-hydroxy-3-acryloyloxypropyl (meth)acrylate, polyethylene glycol #200 di(meth)acrylate, polyethylene glycol #400 di(meth)acrylate, polyethylene glycol #600 di(meth)acrylate, polyethylene glycol #1000 di(meth)acrylate, propoxylated ethoxylated bisphenol A di(meth)acrylate, ethoxylated bisphenol A di(meth)acrylate, 9,9-bis[4-(2-(meth)acryloyloxyethoxy)phenyl]fluorene, propoxylated bisphenol A di(meth)acrylate, tricyclodecanedimethanol di(meth)acrylate, 1,10-decanediol di(meth)acrylate, 1,6-hexanediol di(meth)acrylate, dipropylene glycol di(meth)acrylate, tripropylene glycol di(meth)acrylate, polypropylene glycol #400 di(meth)acrylate, polypropylene glycol (#700) di(meth)acrylate and polytetramethylene glycol #650 di(meth)acrylate, all of which are bifunctional; trimethylolpropane tri(meth)acrylate, pentaerythritol tri(meth)acrylate and ethoxylated isocyanuric acid tri(meth)acrylate, all of which are trifunctional; and the like.

In another embodiment, from the viewpoint of improving the grafting amount, a polyfunctional (meth)acrylate may be used as the above-described compound having the group B reactive with intermediate active species. The polyfunctional (meth)acrylate has the same meaning as that described above.

In one embodiment, the group B reactive with intermediate active species is a group represented by:

wherein $R^{b1}$ is a single bond; and $R^{c1}$ represents a hydrogen atom, or an alkyl group having 1 to 10 carbon atoms (preferably an alkyl group having 1 to 5 carbon atoms, and more preferably a methyl group) or a phenyl group, and is preferably a methyl group or a hydrogen atom.

In the present embodiment, examples of the above-described compound having the group B reactive with intermediate active species may include a compound in which, for example, an alkyl group having 1 to 12 carbon atoms, specifically an alkyl group having 1 to 10 carbon atoms, and more specifically an alkyl group having 3 to 10 carbon atoms is bonded to the above-described group B reactive with intermediate active species.

In the present embodiment, examples of the above-described compound having the group B reactive with intermediate active species may include, for example, 1-hexene, 1-octene, 1-decene, 1-dodecene, isobutene, pentene, heptene, nonene and the like.

Examples of the above-described compound having a moiety to be a radical cation include, for example, various alcohols and the like. In these compounds, a part of the molecule or molecular chain can be desorbed over the course of the reaction. It is believed that the alcohol radical cation produced through radiation chemical reaction withdraws an electron from surrounding medium (such as the resin material) and indirectly produces a polymer radical on the resin material while itself becoming an alcohol radical, and grafted to the molecular chain of the resin material. In association with a series of such chemical reactions, it is believed that desorption of hydrogen occurs.

Examples of the above-described compound having a moiety to be a radical anion include, for example, toluene. In these compounds, desorption of the molecule or molecular chain may occur over the course of the reaction. It is believed that the toluene radical anion produced through radiation chemical reaction donates an electron to surrounding medium (such as the resin material) and forms a polymer radical cation on the molecular chain of the resin material while itself becoming a toluene radical, and undergoes a grafting reaction. In association with a series of such chemical reactions, desorption of hydrogen occurs.

Examples of the above-described compound having a moiety to be a radical include, for example, a halogen compound containing a halogen element in the molecular structure. In such a halogen compound, irradiation of radiation induces dissociating electron addition reaction to produce a radical thereon. The halogen ion that is desorbed upon this serves as a reducing agent to donate an electron to surrounding media (such as the resin material), and forms a polymer radical on the molecular chain of the resin material. It is believed that the radical on the halogen compound and the polymer radical of the resin material react and the grafting reaction proceeds. In association with a series of such chemical reactions, hydrogen halide and hydrogen are generated.

Examples of the above-described compound having a moiety to be intermediate active species (for example, radical cations, radical anions or radicals, preferably radicals) may include acetophenone, benzoin isopropyl ether, benzophenone, Michler's ketone, chlorothioxanthone, isopropylthioxanthone, benzyl dimethyl ketal, acetophenone diethyl ketal, α-hydroxycyclohexyl phenyl ketone, 2-hydroxy-2-methyl-phenylpropane and derivatives thereof; acetophenone 0-benzoyloxime, nifedipine, 1,2-bis(4-methoxyphenyl)-2-oxoethyl cyclohexylcarbamate, 2-nitrobenzyl cyclohexylcarbamate, 2-(9-oxoxanthen-2-yl)propionic acid 1,5,7-triazabicyclo[4.4.0]dec-5-ene and derivatives thereof; alcohols such as ethyl alcohol and isopropyl alcohol; a variety of organic solvents such as toluene, xylene, hexane, cyclohexane, benzene and tetrahydrofuran; various salts such as onium salts and sulfonium salts; various initiators (cationic polymerization initiators) that produces a Broensted acid or a Lewis acid; and the like. One of these compounds may be used singly, or a plurality of them may be used in combination. When a plurality of compounds are used, they may be premixed and used.

In one embodiment, a plurality of compounds having a moiety to be intermediate active species are used. For example, when two of the above-described compounds having a moiety to be intermediate active species are used, these two compounds can be mixed and used in the proportion of 1:99 to 99:1 in weight ratio, and when such compounds are solids, they may be dissolved in a solvent and used.

In another embodiment, the above-described compound having a moiety to be intermediate active species may also be used as a polymerization solvent for the graft polymerization. It is preferable that a good solvent to the resin material (a compound having a high affinity to the resin material) and a poor solvent to the resin material (a compound having a low affinity to the resin material) be selected among the above-described compounds having a moiety to be intermediate active species and used in combination. By using a combination of such solvents to carry out the grafting reaction, the fluorine-containing compound and the non-fluorinated compound are allowed to efficiently undergo the grafting reaction at a reaction initiation point in the resin material produced by irradiation with radiation without dissolution of the resin material itself. By using solvents in combination as described above, it is possible to adjust the permeability to the resin material or the affinity with the resin material.

In the above-described embodiment, it is preferable to use the good solvent and the poor solvent at a volume ratio of good solvent:poor solvent=1:99 to 50:50, more preferable to use them at 5:95 to 35:65, particularly preferable to use them at 10:90 to 30:70, and further preferable to use them at 10:90 to 20:80. By using such solvents, it becomes easier to suppress dissolution of the resin material and make the resin swell. As a result of the swelling, the molecular mobility of the resin is promoted, and the permeating force of the fluorine-containing compound or the non-fluorinated compound to be graft-polymerized from the surface to the inside of the resin material can be improved as well.

For example, when the resin constituting the resin material is a cycloolefin resin or polyethylene, a cyclic alkane (for example, cyclohexane) may be used as a good solvent and a lower alcohol (for example, isopropyl alcohol) may be used as a poor solvent. More specifically, it is preferable to use the cyclic alkane and the lower alcohol at a volume ratio of cyclic alkane:lower alcohol=1:99 to 50:50, more preferable to use them at 5:95 to 35:65, particularly preferable to use them at 10:90 to 30:70, and further preferable to use them at 10:90 to 20:80.

In addition, as a secondary effect, a good solvent that has permeated the inside of the resin material due to swelling of the resin material, or the above-described non-fluorinated compound dissolved in a good solvent, and the resin material may be chemically bonded at a portion of the resin material through chemical reaction induced by irradiation of radiation and undergo a grafting reaction, or the resin material may be crosslinked in itself to form a network structure.

In one embodiment, the a network structure is formed by forming a crosslink between the resin material through irradiation of radiation (bridged structure). The resin constituting the resin material that may be used in the present embodiment has the same meaning as that described above, but in particular, polyethylene may be used therefor.

The mass ratio between the above-described fluorine-containing compound and the above-described non-fluorinated compound used for the graft polymerization is preferably within the range of 1:99 to 99:1, preferably within the range of 20:80 to 80:20, and more preferably within the range of 40:60 to 60:40.

In a preferable embodiment, as the above-described fluorine-containing compound, at least one selected from the group consisting of:
a fluorine-containing acrylate ester (for example, $CH_2=CHC(=O)O-(CH_2)_{n9}Rf^9$, wherein $Rf^9$ is a perfluoroalkyl group having 1 to 10 carbon atoms and n9 is an integer of 1 to 10, specifically 2-(perfluorobutyl)ethyl acrylate and 2-(perfluorohexyl)ethyl acrylate); and a compound represented by $Rf'CH=CH_2$, wherein $Rf'$ is represented by $F-(CF_2)_n$, where n is an integer of 1 to 10, and more preferably, n is an integer of 4 to 8 is used, and as the above-described non-fluorinated compound, at least one selected from the group consisting of:
a (meth)acrylic monomer (for example, stearyl acrylate); cyclohexane;
an alcohol (for example, isopropyl alcohol); and 1-hexene, 1-octene, 1-decene and 1-dodecene is used.

More preferably, as the above-described fluorine-containing compound, at least one selected from the group consisting of:
a fluorine-containing acrylate ester (for example, $CH_2=CHC(=O)O-(CH_2)_{n9}Rf^9$, wherein $Rf^9$ is a perfluoroalkyl group having 1 to 6 carbon atoms and n9 is an integer of 4 to 8, specifically $Rf^9$ is a perfluoroalkyl group having 4 or 6 carbon atoms and n9 is 2, and specifically 2-(perfluorobutyl)ethyl acrylate and 2-(perfluorohexyl)ethyl acrylate); and
a compound represented by $Rf'CH=CH_2$, wherein $Rf'$ is represented by $F-(CF_2)_n$, where n is an integer of 4 to 8, and specifically, n is an integer of 6
is used, and
as the above-described non-fluorinated compound, at least one selected from the group consisting of:
stearyl acrylate;
cyclohexane;
isopropyl alcohol; and
1-hexene, 1-octene, 1-decene and 1-dodecene
is used.

In a preferable embodiment, 2-(perfluorohexyl)ethyl acrylate is used as the fluorine-containing compound, and stearyl acrylate is used as the non-fluorinated compound.

The above-described composition including the fluorine-containing compound and/or the non-fluorinated compound may include another compound, such as a solvent (hereinafter, may be referred to as a "polymerization solvent"), a crosslinking coagent and a polymerization initiator. The above-described composition may be included at, for example, 1 to 10000 parts by mass relative to 100 parts by mass of the above-described fluorine-containing compound and/or the non-fluorinated compound.

The above-described polymerization solvent is not limited, but those not dissolving or deteriorating the resin material may be used, and those capable of dissolving or dispersing the grafting compounds are preferable. When a solvent capable of dissolving a polymer only composed of the grafting compounds is used, separation of the resin material after the graft polymerization becomes easier. For the polymerization solvent, for example, a non-fluorinated solvent, specifically ketones such as acetone, methyl ethyl ketone and methyl isobutyl ketone; carbon tetrachloride; a fluorinated solvent (specifically, hydrofluoroether or dichloropentafluoropropane); or the like can be used.

Examples of the above-described crosslinking coagent are not limited, and for example, a polyfunctional (meth)acrylate, specifically 1,9-nonanediol di(meth)acrylate, 2-hydroxy-3-acryloyloxypropyl (meth)acrylate, polyethylene glycol #200 di(meth)acrylate, polyethylene glycol #400 di(meth)acrylate, polyethylene glycol #600 di(meth)acrylate, polyethylene glycol #1000 di(meth)acrylate, propoxylated ethoxylated bisphenol A di(meth)acrylate, ethoxylated bisphenol A di(meth)acrylate, 9,9-bis[4-(2-(meth)acryloyloxyethoxy)phenyl]fluorene, propoxylated bisphenol A di(meth)acrylate, tricyclodecanedimethanol di(meth)acrylate, 1,10-decanediol di(meth)acrylate, 1,6-hexanediol di(meth)acrylate, dipropylene glycol di(meth)acrylate, tripropylene glycol di(meth)acrylate, polypropylene glycol #400 di(meth)acrylate, polypropylene glycol (#700) di(meth)acrylate or polytetramethylene glycol #650 di(meth)acrylate, all of which are bifunctional; or trimethylolpropane tri(meth)acrylate, pentaerythritol tri(meth)acrylate or ethoxylated isocyanuric acid tri(meth)acrylate, all of which are trifunctional may be used.

Examples of the radiation for generating a reaction initiation point in the resin are not limited as long as it may generate a reaction initiation point composed of intermediate active species such as radicals, radical cations or radical anions when it is irradiated to the resin material, and electron beam (β-ray), X-ray, γ-ray, neutron ray, ultraviolet ray including extreme ultraviolet ray, plasma, ion irradiation or the like may be used.

In a certain embodiment, electron beam using an electron accelerator is preferable because it allows easy control of the permeation depth (range) of ionizing radiation and it may generate intermediate active species in the resin.

The absorbed dose of the irradiated ionizing radiation is 0.1 to 1000 kGy, preferably 1 to 300 kGy and more preferably 10 to 200 kGy. When the absorbed dose is 1000 kGy or less, change (for example, deterioration) of material properties due to chemical reactions of the resin material at the surface layer can be minimized. When the absorbed dose is 1 kGy or more, intermediate active species may be produced at a sufficient amount for the surface graft polymerization. The energy absorption amount of the resin material can be measured with a Fricke dosimeter, a scintillation detector, a semiconductor detector or the like, but more simply, it can be measured through change in the light absorption amount using, for example, a cellulose triacetate film (CTA: cellulose triacetate) dosimeter, a radiochromic film dosimeter, a PMMA dosimeter or the like.

When electron beam is used, an electron accelerator is used, and the electronic energy of the electron beam irradiated to the resin material is preferably at most 10 MeV, more preferably 1 MeV or less, further preferably 300 keV or less, particularly preferably 150 keV or less, and further more preferably less than 100 keV at the surface of the resin material. When the electronic energy at the surface of the resin material is less than 100 keV, most of electron beams are substantially absorbed only at the vicinity of the surface of the resin material, and almost no electron beam would permeate into the substrate further inside, and therefore, chemical reactions of the resin material due to electron beam may be reduced, and change in physical properties due to crosslinking, degradation or the like of the resin material associated with chemical reactions may be suppressed. Furthermore, since the resin absorbs energy only at the surface of the resin material, leading to impartment of an extremely high energy, intermediate active species participating the graft polymerization can be produced efficiently. On the other hand, when the incident energy of electrons at the surface of the resin material (for example, the outermost surface) is 10 keV or more, and preferably 30 keV or more, intermediate active species can be produced at a sufficient degree for the surface graft polymerization at the surface of the resin material.

In the case where electron beam from an electron accelerator is used, if the space between the electron source and the resin material is under a reduced pressure of 1 Pa or less or under a vacuum environment, the electronic energy generally corresponds to the accelerating voltage, and this accelerating voltage is preferably at most 10 MV, more preferably 1 MV or less, further preferably 300 kV or less, further more preferably 150 kV or less, and further more preferably less than 100 kV.

For example, when the accelerating voltage for electron beam is 60 kV in vacuum, the depth that the electron beam reaches may be about 60 μm if the irradiated molding material is a non-fluorinated resin, and about 30 μm if the irradiated molding material is a fluororesin.

On the other hand, if an electron accelerator is used which has an irradiation window for extraction to the atmosphere (such as titanium foil) between the electron gun and a sample (that is, the resin material), even when the irradiation is carried out in vacuum, the electronic energy is attenuated upon passing through the irradiation window. When the irradiation environment is under an atmosphere of an inert gas such as nitrogen, argon and helium, energy loss of electrons occurs in the inert gas, and therefore, the energy at the surface of the resin material varies depending on the distance from the electron extraction window to the resin material. For example, when electrons pass through nitrogen gas stream as well, the energy needs to be increased considering attenuation depending on the density of the gas stream and the distance to the resin material.

When electron beam is used, the irradiated dose of electrons irradiated to the resin material is 10 μC/cm$^2$ to 10 mC/cm$^2$, preferably 50 μC/cm$^2$ to 1 mC/cm$^2$, and more preferably 100 μC/cm$^2$ to 300 μC/cm$^2$ such as 200 μC/cm$^2$. By making the irradiated dose within such a range, intermediate active species can be generated efficiently. The irradiated dose of electrons can be measured with a Faraday cup or a current integrator.

From the viewpoint of suppressing oxidative deterioration of the resin material and pair annihilation of produced, intermediate active species, irradiation of the resin material with ionizing radiation is carried out preferably under an atmosphere where substantially no oxygen is present, for example, where the oxygen concentration is 1000 ppm or less, more preferably 500 ppm and further more preferably 100 ppm or less. For example, the irradiation with ionizing radiation is carried out in vacuum or under an atmosphere of an inert gas such as under nitrogen, argon or helium atmosphere. Note that the vacuum is not necessarily perfect vacuum and just needs to be a substantial vacuum. For example, it may be any of a reduced pressure environment of approximately 10$^3$ Pa, a low vacuum of approximately 10$^{-1}$ Pa and a high vacuum not more than that. In addition, in another embodiment, irradiation with ionizing radiation may be carried out under the atmospheric air in order to obtain peroxide radicals. Meanwhile, from the viewpoint of avoiding decline of material properties due to oxidative deterioration, it is preferable to produce intermediate active species such as radicals in the absence of oxygen and then supply oxygen to obtain peroxide radicals or peroxides. Moreover, in order to prevent deactivation of intermediate active species produced in the resin material, the resin material after the irradiation is preferably stored at a low temperature of the glass transition temperature of the polymer constituting that resin or lower, and more preferably at a liquid nitrogen temperature. It is also preferable to store the resin in vacuum or under an atmosphere of an inert gas.

The permeation depth of ionizing radiation may be the thickness of the resin material or more. The permeation depth of ionizing radiation is preferably 0.001 to 99% such as 0.01 to 99%, 0.1 to 99% or 0.2 to 99%, more preferably 1.0 to 95%, and further more preferably 3 to 90% such as 5 to 80%, 10 to 60% or 20 to 60% of the thickness of the resin material. For example, the permeation depth of ionizing radiation is a depth of 0.2 to 20 mm, 0.2 to 1 mm or 0.2 to 500 μm, and is preferably a depth of 0.2 to 200 μm, more preferably 1 to 100 μm, further preferably 2 to 60 μm, and further more preferably 3 to 50 μm from the surface of the resin material.

In another embodiment, the permeation depth of ionizing radiation may be a depth of, for example, 1 to 50 μm or 5 to 50 μm from the surface of the resin material.

The permeation depth of ionizing radiation means a depth over which the resin material absorbs energy of ionizing radiation or a depth over which ionizing radiation imparts energy to the resin material. The permeation depth of ionizing radiation is substantially the same as the area in which intermediate active species, which induce the surface graft polymerization, are generated, but since the surface of the resin material slightly swells due to the surface grafting reaction, the depth to which the graft chain is present in the molding material after the grafting reaction can be deeper than the permeation depth of ionizing radiation.

In a certain embodiment, the radiation source is ultraviolet ray. By irradiation with ultraviolet ray of the resin material in which 0.5 to 10% by mass, preferably 1 to 7% by mass, and more preferably 2 to 5% by mass of a photoreaction initiator is mixed relative to 100% by mass of the resin material, the photoinitiator is allowed to absorb energy and intermediate active species may be generated in the resin. Here, examples of the photoreaction initiator include, for example, Irgacure from BASF SE. The photoreaction initiator may be formed by introducing a ketone (C=O) structure absorbing an ultraviolet wavelength of around 300 nm to 450 nm into the structure of the resin material.

When ultraviolet ray is used in the above-described embodiment, it is possible to use an excimer laser light source such as ArF and KrF, as well as a mercury lamp, a Xe lamp and a UV-LED light source. In addition, radiated light from a synchrotron device may be used. Furthermore, extreme ultraviolet light having an even shorter wavelength may be used.

In the above-described embodiment, the light quantity of ultraviolet ray irradiated to the resin material is preferably at most 100 J/cm$^2$, more preferably 50 J/cm$^2$ or less, further preferably 10 J/cm$^2$ or less, further more preferably 5 J/cm$^2$ or less, and further more preferably less than 2 J/cm$^2$ at the surface of the molding material. The light quantity of ultraviolet ray may be, for example, 10 mJ/cm² or more.

In the above-described embodiment, by selecting a transparent material for the resin material, photochemical reactions can be induced further inside from the outermost surface of the resin material.

The above-described graft polymerization between intermediate active species produced on the resin material and the grafting compounds is carried out by contacting intermediate active species (such as radicals) in the resin material, produced by irradiation with radiation, with the grafting compounds. The above-described contact can be carried out regardless of gas phase, liquid phase or solid phase. The contact between intermediate active species in the resin material and the grafting compounds is carried out by, for example, immersing the resin material in a solution of the grafting compounds, dropping or applying the grafting compounds onto the resin material, or placing the resin material in the presence of gaseous grafting compounds. A method in which the resin material is immersed in a solution of the grafting compounds is preferable because even when the surface of the resin material and the grafting compounds both have low wettabilities, they can be brought into contact uniformly and certainly.

In one embodiment, the above-described graft polymerization is carried out by irradiation of the resin material with radiation and then contacting the resin material after the irradiation of radiation with the grafting compounds (subsequent grafting method).

In the above-described embodiment, the temperature upon the irradiation of radiation is not limited, but it is for example 50° C. or lower, preferably room temperature or lower, and more preferably the γ dispersion temperature, at which segmental motions of side chains in the molding material occur, or lower. By performing the irradiation at a low temperature, deactivation of intermediate active species can be prevented. In the present specification, room temperature indicates 20 to 30° C.

In the above-described embodiment, the reaction temperature upon the graft polymerization after the irradiation of radiation is not limited, but it is for example room temperature to 120° C., preferably 40 to 100° C., and more preferably 50 to 80° C. When this reaction temperature is high, the amount of a polymer produced, not contributing to the grafting reaction and only formed of the grafting compounds becomes large.

In one embodiment, the above-described graft polymerization is carried out by irradiation with radiation simultaneously to the resin material and the grafting compounds (simultaneous grafting method). In particular, radiation is irradiated in a state where the resin material is brought into contact with the grafting compound. This embodiment is preferable from the viewpoint where the grafting reaction proceeds more satisfactorily.

In the above-described embodiment, the temperature upon the irradiation of radiation is not limited, but it is for example 100° C. or lower, preferably 10 to 70° C., and more preferably 20° C. to 50° C. By performing the simultaneous irradiation, intermediate active species produced in the resin material and grafting compound react with each other and are graft-polymerized.

In one embodiment, the above-described graft polymerization is carried out by irradiation with radiation separately to the resin material and the grafting compounds, and then contacting the resin material after the irradiation with the grafting compound after the irradiation (sequential grafting method).

In the above-described embodiment, the temperature upon the irradiation of radiation is not limited, but it is for example 100° C. or lower, preferably 10 to 70° C., and more preferably 20° C. to 50° C. By performing the simultaneous irradiation, intermediate active species produced in the resin material and grafting compounds react with each other and are graft-polymerized, and intermediate active species in the resin material not contributing to the polymerization thereof may react with grafting compounds that are further brought into contact after the irradiation and be graft-polymerized.

In the above-described embodiment, the reaction with grafting compounds after the irradiation of radiation is preferably a thermal reaction. The temperature of the above-described thermal reaction is for example room temperature to 120° C., preferably 40 to 100° C., and more preferably 50 to 80° C. When this reaction temperature is at a certain temperature or lower, the amount of a polymer produced, not contributing to the grafting reaction and only formed of the grafting compounds can be suppressed.

In one embodiment, the above-described graft polymerization is carried out by irradiation with radiation simultaneously to the resin material and the non-fluorinated compound to have them graft-polymerized (simultaneous grafting method), and then contacting the obtained resin material with the fluorine-containing compound (sequential grafting method). This embodiment is preferable from the viewpoint where the grafting reaction proceeds more satisfactorily.

In the above-described embodiment, the temperature upon the irradiation of radiation is not limited, but it is for example 100° C. or lower, preferably 10 to 70° C., and more preferably 20° C. to 50° C. By performing the simultaneous irradiation, intermediate active species produced in the resin material and the non-fluorinated compound react with each other and are graft-polymerized, and intermediate active species in the resin material not contributing to the polymerization thereof react with the fluorine-containing compound through the reaction after the irradiation and are graft-polymerized.

In the above-described embodiment, the reaction after the irradiation is preferably a thermal reaction. The temperature of the above-described thermal reaction is for example room temperature to 120° C., preferably 40 to 100° C., and more preferably 50 to 80° C. When this reaction temperature is at a certain temperature or lower, the amount of a polymer produced, not contributing to the grafting reaction and only formed of the grafting compounds can be suppressed.

In one embodiment, the above-described graft polymerization is carried out by irradiation with radiation simultaneously to the resin material and the fluorine-containing compound to have them graft-polymerized (simultaneous grafting method), and then contacting the resin material after the irradiation with the non-fluorinated compound (sequential grafting method). This embodiment is preferable from the viewpoint where the grafting reaction proceeds more satisfactorily.

The temperature upon the above-described irradiation of radiation is not limited, but it is for example 100° C. or lower, preferably 10 to 70° C., and more preferably 20° C. to 50° C. By performing the simultaneous irradiation, intermediate active species produced in the resin material and the fluorine-containing compound react with each other and are graft-polymerized, and intermediate active species in the resin material not contributing to the polymerization thereof react with the non-fluorinated compound through the reaction after the irradiation and are graft-polymerized.

In the above-described embodiment, the reaction after the irradiation is preferably a thermal reaction. The temperature of the above-described thermal reaction is for example room temperature to 120° C., preferably 40 to 100° C., and more preferably 50 to 80° C. When this reaction temperature is too high, the amount of a polymer produced, not contributing to the grafting reaction and only formed of the grafting compounds can become large.

In the above-described embodiment, a time period of the thermal reaction can be adjusted in order to reduce the production amount of the polymer only formed of the grafting compounds. For example, when the reaction temperature is higher than 120° C., a time period of the thermal reaction is preferably within 6 hours, more preferably within 4 hours, and further preferably within 2 hours.

The above-described reaction time of the graft polymerization through the thermal reaction after the irradiation of radiation is not limited, but it is for example 30 minutes to 32 hours, preferably 1 to 20 hours, and more preferably 2 to 16 hours.

The above-described graft polymerization can be carried out by contacting the resin material with a single or a plurality of grafting compounds. For the grafting compound, it is preferable to use it after lowering the concentration of or removing impurities such as oxygen in the atmosphere that can be a reaction inhibitor, or dissolved oxygen, a polymerization inhibitor and the like in the grafting compound, preferably through an approach such as bubbling with an inert gas including nitrogen gas and argon gas, or freeze vacuum deaeration.

The graft polymerization in the present invention may be carried out by contacting the resin material with the grafting compounds and then carrying out a graft polymerization treatment once simultaneously with the irradiation of radiation (simultaneous grafting method). Alternatively, the graft polymerization may be carried out by irradiation of the resin material with radiation and then adding the grafting compounds to the resin material after the irradiation to carry out a graft polymerization treatment (subsequent grafting method). Moreover, as another method, the graft polymerization may be carried out through multistage graft polymerization treatment in which graft polymerization treatment is carried out multiple times (for example, twice) (sequential grafting method). Furthermore, when the multistage sequential graft polymerization treatment is carried out, the fluorine-containing compound and the non-fluorinated compound may be added over multiple times.

In one embodiment, either one of the fluorine-containing compound and the non-fluorinated compound may be polymerized in the first stage graft polymerization treatment, and the other of the non-fluorinated compound and the fluorine-containing compound may be polymerized in the second stage polymerization treatment. It is preferable to have the non-fluorinated compound polymerized in the first stage polymerization treatment, and to have the fluorine-containing compound polymerized in the second stage polymerization treatment.

In one certain embodiment, it may be possible to contact the resin material with one or more grafting compounds and then carry out the first stage graft polymerization treatment simultaneously with irradiation of radiation, and subsequently, add a single or a plurality of grafting compounds to the first stage graft-polymerized product to carry out the second stage graft polymerization treatment.

In one certain embodiment, it may be possible to contact the resin material with a grafting compound and then carry out the first stage graft polymerization treatment simultaneously with irradiation of radiation, and subsequently, carry out a heat treatment to the first stage graft-polymerized product and an unreacted grafting compound component to carry out the second stage graft polymerization treatment.

In one certain embodiment, it may be possible to contact the resin material with one or more grafting compounds and then carry out the first stage graft polymerization treatment simultaneously with irradiation of radiation, subsequently add one or more grafting compounds to the first stage graft-polymerized product to carry out the second stage graft polymerization treatment, and further add one or more grafting compounds to carry out the third stage graft polymerization treatment.

In one certain embodiment, it may be possible to irradiate to the resin material with radiation and then add one or more grafting compounds to the resin material to carry out the first stage graft polymerization treatment, and further add one or more grafting compounds to carry out the second stage graft polymerization treatment.

In one certain embodiment, it may be possible to contact the resin material with one or more grafting compounds and then carry out the first stage graft polymerization treatment simultaneously with irradiation of radiation, and subsequently, further add one or more grafting compounds to the first stage graft-polymerized product and irradiate radiation thereto to carry out the second stage graft polymerization treatment.

In one certain embodiment, it may be possible to contact the resin material with one or more grafting compounds and then carry out the first stage graft polymerization treatment simultaneously with irradiation of radiation, subsequently further add one or more grafting compounds to the first stage graft-polymerized product and irradiate radiation thereto to carry out the second stage graft polymerization treatment, and further add one or more grafting compounds to the second stage graft-polymerized product to carry out the third stage graft polymerization treatment.

In one certain embodiment, it may be possible to contact the resin material with one or more grafting compounds and then carry out the first stage graft polymerization treatment simultaneously with irradiation of radiation, subsequently further add one or more grafting compounds to the first stage graft-polymerized product and irradiate radiation thereto to carry out the second stage graft polymerization treatment, and further carry out a heat treatment to the second stage graft-polymerized product and an unreacted grafting compound component to carry out the third stage graft polymerization treatment.

When the multistage sequential graft polymerization treatment is carried out, reaction conditions for polymerization may be altered for each stage. For example, after the irradiation of radiation, the reaction speed may be controlled by changing the reaction temperature or polymerization pressure. The reaction temperature can be appropriately selected depending on the grafting compound (the fluorine-containing compound and the non-fluorinated compound) or the solvent, but for example, the reaction can be carried out within the range of 10 to 150° C. The polymerization pressure can be appropriately selected depending on the grafting compound (the fluorine-containing compound and the non-fluorinated compound) or the solvent, but for example, the reaction can be carried out within the range of 0.1 Pa to 10 MPa. Irradiation of radiation may be carried out multiple times.

When the multistage sequential graft polymerization treatment is carried out, it is only necessary to have the fluorine-containing compound and the non-fluorinated compound react eventually, and the order of their reactions is not limited. For example, one of the fluorine-containing compound and the non-fluorinated compound may be reacted in the first stage and the other may be reacted in the second stage, or one of the fluorine-containing compound and the non-fluorinated compound may be reacted in the first stage, the other may be reacted in the second stage, and one of the fluorine-containing compound and the non-fluorinated compound may be further reacted in the third stage. Moreover, both of the fluorine-containing compound and the non-fluorinated compound may be reacted in a certain stage. For example, the non-fluorinated compound may be reacted in the first stage, both of the fluorine-containing compound and the non-fluorinated compound may be reacted in the second stage, and the fluorine-containing compound may be reacted in the third stage.

The sequential graft polymerization may be carried out, combining a plurality of polymerization methods. For example, a simultaneous graft polymerization using radiation may be carried out at first, and then, polymerization using another method, for example, thermal polymerization may be carried out. In addition, a simultaneous graft polymerization using ionizing radiation may be carried out at first, and then, a simultaneous graft polymerization using ultraviolet ray may be carried out.

The above-described method may further include at least contacting the resin material before the irradiation of radiation with a solvent. It is preferable to have the resin material and the solvent contact with each other until the resin material swells due to the solvent, and for example, they may be in contact with each other until all of or a part of the resin material (for example, pellet) becomes clouded, or the resin material and the solvent may be in contact with each other for 1 to 24 hours. Furthermore, alternatively, it may be possible to have the resin material and the solvent contact with each other at an increased temperature, for example, at a temperature of 20° C. to 150° C.

It is believed that, due to the above-described step, the grafting compounds to be added in a later step easily permeate and are dispersed into the inside of the resin material, because the resin material swells due to the solvent. Due to the above-described step, formation of the graft chain inside the resin material becomes easier and the degree of grafting may be further improved. Furthermore, as a secondary effect, formation of a network structure or the like may occur due to bridge formation with the graft chain between polymers constituting the resin material.

The contact between the resin material and the solvent is carried out by, for example, immersing the resin material in the solvent, dropping or applying the solvent onto the resin material, or placing the resin material in the presence of the solvent in the gaseous state. From the viewpoint where the solvent is uniformly present in the resin material, it is preferable to immerse the resin material in the above-described solvent.

According to one embodiment, in the above-described step of at least contacting the resin material with a solvent, the resin material is brought into contact with the fluorine-containing compound and/or the non-fluorinated compound along with the solvent. In this embodiment, furthermore, before irradiation of radiation, a fluorine-containing compound and/or a non-fluorinated compound that is the same as or different from the above-described fluorine-containing compound and non-fluorinated compound added along with the solvent may be brought into contact with the resin material.

In one embodiment, after the above-described step of at least contacting the resin material with a solvent and before irradiation of the resin material with radiation, the fluorine-containing compound and/or the non-fluorinated compound may be brought into contact with the resin material.

For the above-described solvent, those not dissolving or deteriorating the resin material can be used, and those capable of dissolving or dispersing the grafting compounds are preferable. When a solvent capable of dissolving a polymer only composed of the grafting compounds is used, separation of the resin material after the graft polymerization becomes easier. From the viewpoint of making the handle-ability advantageous, for the above-described solvent, it is preferable to use those unlikely to be volatilized (for example, a compound having a boiling point of 100° C. or higher). The above-described solvent may be the same type as the polymerization solvent.

Specific examples of the above-described solvent may include ethyl alcohol, isopropyl alcohol, acetone, methyl ethyl ketone, methyl isobutyl ketone, cyclohexane, n-hexadecane, liquid paraffin, tetrahydrofuran and the like.

In another embodiment, examples of the solvent may include acetone, methyl ethyl ketone, methyl isobutyl ketone, n-hexadecane, liquid paraffin and the like.

Along with the above-described solvent, a crosslinking coagent or the like may be added. The crosslinking coagent has the same meaning as that described above.

In another embodiment, a method for forming the molding material from the resin material includes contacting the resin material with the grafting compounds (or the composition including the grafting compounds), and then irradiating the resin material with radiation to introduce the graft chain containing constituent units derived from the fluorine-containing compound and constituent units derived from the non-fluorinated compound to the resin material (graft-polymerization) to form the molding material. It is preferable to have the resin material and the grafting compounds contact with each other until the resin material swells due to the grafting compounds, and for example, they may be in contact with each other until the resin material (for example, pellet) becomes clouded, or the resin material and the grafting compounds may be in contact with each other for 1 to 24 hours. It is believed that, by having the resin material and the grafting compounds contact with each other in advance before irradiating the resin material with ionizing radiation, it becomes easier for the grafting compounds to be included inside the resin material. In addition, it is believed that, since the resin material swells due to the grafting compounds and the molecular mobility of the resin constituting the resin material is improved, the permeability and dispersibility of the grafting compounds into the inside of the resin material are improved. As a result, formation of the graft chain inside the resin material becomes easier and the degree of grafting can be more satisfactory.

The above described contact between the resin material and the grafting compounds (or the composition including the grafting compounds) is carried out by, for example, immersing the resin material in at least the grafting compounds, dropping or applying at least the grafting compounds onto the resin material, or placing the resin material in the presence of at least the grafting compounds in the gaseous state. From the viewpoint where the grafting compounds are uniformly present in the resin material, it is preferable to immerse the resin material in the above-described grafting compounds.

In the present embodiment, after at least contacting the resin material with the fluorine-containing compound and/or the non-fluorinated compound and before irradiation of the resin material with radiation, a fluorine-containing compound and/or a non-fluorinated compound may be brought into contact with the resin material. This fluorine-containing compound and/or non-fluorinated compound is the same as or different from the fluorine-containing compound and non-fluorinated compound that have been brought into contact with the resin material in advance.

After the irradiation of radiation, a step of further contacting a fluorine-containing compound and/or a non-fluorinated compound with the resin material may be included. The fluorine-containing compound and/or the non-fluorinated compound used in this step is the same as or different from the fluorine-containing compound and the non-fluorinated compound used before the step of irradiation of the resin material with radiation.

The resin material, fluorine-containing compound, non-fluorinated compound, composition including grafting compounds, composition including the fluorine-containing compound, composition including the non-fluorinated compound, radiation, ionizing radiation, graft polymerization and the like are the same as those described above, and therefore, the same description will not be provided.

In one embodiment, the molding material after the grafting reaction and the resin material not subjected to the grafting reaction are mixed, and subjected to molding and processing through various methods. By mixing them as described above, it becomes easier to have the resin molded body express the effect owing to the fluorine-containing grafting compound in the molding material after the grafting reaction. The mixed amount of the resin material not subjected to the grafting reaction is preferably at most 200% by mass, more preferably 100% by mass or less, further preferably 50% by mass or less, and further more preferably 20% by mass or less relative to 100% by mass of the resin molded body. The mixed amount of the resin material not subjected to the grafting reaction can be 1% by mass or more relative to 100% by mass of the resin molded body.

In the above-described embodiment, in the case where the resin constituting the resin material included in the molding material after the grafting reaction and the resin constituting the resin material not subjected to the above-described grafting reaction are the same kind of resin, when the amount of the resin material not subjected to the grafting reaction mixed to the molding material (the proportion of the added resin material not subjected to the grafting reaction, relative to the resin molded body) is smaller, desired functionalities expressed in the resin molded body obtained through molding and processing may be improved. On the other hand, when the mixed amount of the resin material not subjected to the grafting reaction is larger, the strength of the molding material and the resin molded body obtained through molding and processing may be improved.

In the above-described embodiment, by controlling the mixed amount of the resin material not subjected to the graft polymerization and the heat treatment temperature, the functionalized area from the surface of the obtained resin molded body may be controlled.

In another embodiment, the molding material after the grafting reaction and various fluorine-containing compounds (or a polymer of fluorine-containing compounds) are mixed, and subjected to molding and processing. By mixing them as such, miscibility (entwinement of molecules) between the fluorine-containing grafting compound included in the molding material and the mixed fluorine-containing compounds (or a polymer of fluorine-containing compounds) can be generated, and it becomes possible to have the resin molded body express not only the effect owing to the fluorine-containing grafting compound, but also an effect of the fluorine-containing compounds (or a polymer of fluorine-containing compounds). The mixed amount of the fluorine-containing compounds (or a polymer of fluorine-containing compounds) is preferably at most 100% by mass, more preferably 50% by mass or less, further preferably 30% by mass or less, and further more preferably 10% by mass or less relative to 100% by mass of the resin molded body. The mixed amount of the fluorine-containing compounds (or a polymer of fluorine-containing compounds) is preferably 1% by mass or more, more preferably 2% by mass or more, and further preferably 5% by mass or more relative to 100% by mass of the resin molded body.

In the above-described embodiment, into the above-described mixture, a resin material not subjected to the graft polymerization may be further mixed.

In the present invention, by molding a molding material as described above, a resin molded body is obtained.

A method of molding a molding material into a resin molded body is not limited, and a common molding method such as mold-molding, extrusion molding, injection molding, ram extrusion, press molding, vacuum molding, transfer molding, blow molding, and nano-imprinting can be used. In addition, the molding material of the present invention can be used in molding that utilizes a coating method such as cast molding by dissolving or dispersing, in particular, dissolving the molding material in a solvent. A preferable method of molding a molding material into a resin molded body is extrusion molding, mold-molding (in particular, mold-molding by placing the molding material in a metal mold and hot pressing it), injection molding or ram extrusion molding. By using such a method, it is possible to have the resin molded body express the effect owing to the fluorine-containing grafting compound (the graft chain).

When the resin molded body obtained by molding the molding material is subjected to a post treatment, preferably a heat treatment, more preferably a heat treatment around the grass transition temperature (hereinafter, may be designated as Tg) of the resin material having the graft chain included in the molding material, further preferably at a temperature, 3° C. lower than Tg, and further more preferably at a temperature, 5° C. lower than Tg, the molecular mobility of the resin material can be promoted and the fluorine-containing grafting compound can be segregated on the surface of the resin molded body without impairing the shape of the resin molded body, thereby promoting expression of functions at the surface of the resin molded body.

By adjusting the temperature at which heat treatment for the resin molded body is performed, the functionalized area from the surface of the obtained resin molded body may be controlled.

In another embodiment, upon subjecting the molding material after the grafting reaction to molding and processing, the duration of the applied heat treatment is prolonged compared to the usual and the resin molded body after the molding is further subjected to a heat treatment.

The temperature upon the molding can be appropriately selected depending on the type of the resin material to be used, and it can be a temperature not less than the glass transition point and not more than the decomposition temperature, and preferably a temperature not less than the melting point and not more than the decomposition temperature.

By adjusting the temperature upon the molding, the functionalized area from the surface of the obtained resin molded body may be controlled.

In one embodiment, upon subjecting the molding material to molding and processing, by prolonging the duration of the applied heat treatment compared to the usual, the molecular mobility of the resin material is activated and segregation of the fluorine-containing grafting compound at the surface of the resin molded body is promoted, thereby making a heat treatment after the molding unnecessary.

In a certain embodiment, a casting solution in which the molding material is dissolved or dispersed in a solvent may be provided, deposited on a substrate through an approach such as bar coating method or spray coating method, and then, further subjected to a heat treatment with infrared ray or a hot iron. Due to the above-described heat treatment, the fluorine-containing grafting compound in the formed, deposited film can be segregated at the surface of the film and expression of functions at the surface can be more possible.

In the above-described embodiment, the heat treatment temperature can be appropriately selected depending on the type of the resin material to be used, and it can be preferably a temperature not less than the glass transition point and not more than the decomposition temperature, and more preferably a temperature not less than the melting point and not more than the decomposition temperature.

In a certain embodiment, a casting solution in which the molding material is dissolved or dispersed in a solvent may be provided, deposited on a substrate through an approach such as bar coating method or spin coating method, and then molded by transferring a mold shape with a nano-imprinting device.

In the above-described embodiment, the temperature upon the nano-imprinting can be appropriately selected depending on the type of the resin material to be used, and it can be preferably a temperature not less than the glass transition point and not more than the decomposition temperature, and more preferably a temperature not less than the melting point and not more than the decomposition temperature.

In the above-described embodiment, when the resin molded body after the molding is subjected to preferably a heat treatment around the grass transition temperature of the molding material, more preferably at a temperature, 3° C. lower than Tg, and further more preferably at a temperature, 5° C. lower than Tg, the molecular mobility of the resin may be promoted and the fluorine-containing grafting compound may be segregated on the surface of the resin molded body without impairing the shape of the resin molded body, thereby promoting expression of functions at the surface of the resin molded body.

Upon the processing and molding of the present molding material and the resin molded body using the same, the resin molded body of the present invention subjected to the grafting and a plastic resin not subjected to the grafting may be kneaded into a plastic whose shape is a pellet or a grain, and a grafting agent for resins, which dilutes the grafting amount with a prescribed rate upon molding of the plastic, may be used.

In one embodiment, a resin molded body may be formed by using the molding material of the present invention and a resin crosslinked through irradiation of radiation and not having a graft chain containing constituent units derived from the fluorine-containing compound and the non-fluorinated compound. In the present embodiment, the molding material of the present invention and the above-described resin crosslinked through irradiation of radiation can be mixed and used.

In the above-described embodiment, the molding material of the present invention may be a resin crosslinked through irradiation of radiation and into which a graft chain containing constituent units derived from the fluorine-containing compound and the non-fluorinated compound is introduced.

In the above-described embodiment, the irradiation of radiation (specifically, ionizing radiation) for crosslinking the resin can be carried out using reaction conditions generally used by those having ordinary skill in the art. For example, the irradiation amount of ionizing radiation is, for example, preferably 10 kGy or more, more preferably 50 kGy or more, further preferably 100 kGy or more, particularly preferably 500 kGy or more, and more preferably 1000 kGy or more.

The shape of the obtained resin molded body is not limited, and it may be any of the desired shapes, such as block, sheet, film, bar, uneven shape, or a variety of other shapes depending on applications.

According to the method of the present invention, by using the molding material having the above-described graft chain, a resin molded body having a high transparency and a smooth surface can be obtained, compared to a conventional method in which a fluorine-containing repellent agent or the like is added upon molding.

For example, the obtained resin molded body can have a haze value of, for example, 2.0% or less, preferably 1.0% or less, and more preferably 0.30% or less. The above-described haze value can be measured with a commercially available hazemeter.

The content of fluorine in the above-described resin molded body is preferably 0.1 to 10 parts by mass and more preferably 1 to 5 parts by mass relative to 100 parts by mass of the resin molded body. The content of fluorine can be determined via a combustion flask method.

According to the method of the present invention, by using the molding material having the above-described graft chain, a resin molded body having excellent functions derived from the graft chain (for example, water-repellency, oil-repellency and the like) can be obtained even in the case where the molding material is subjected to molding in the same way as a conventional way, for example, even in the case where a molding material having the same shape as a conventional molding material (for example, a pellet material or the like) is used and subjected to molding with a conventional molding method (for example, injection molding, extrusion molding or the like). That is, according to the method of the present invention, functions may be imparted to a resin molded body more simply, rather than subjecting the surface of the resin molded body after molding to grafting.

The method of the present invention can form a resin molded body having a complicated surface shape. The method of the present invention can form a larger resin molded body compared to that formed by the above-described conventional method, in which the size of the resin molded body subjected to molding is limited from the viewpoint of facilities. In contrast, it was difficult to form a resin molded body as described above for a method that has been considered conventionally (for example, a method in Patent Literature 1), in which radiation is irradiated to the surface of the resin molded body, which is a molded article, to produce intermediate active species and fluorine-containing monomers are grafted thereto.

According to the method of the present invention, by using the molding material having the graft chain, the graft chain is allowed to be present comparatively uniformly on the surface of the resin molded body. In contrast, it was difficult for the above-described conventional method to uniformly form the graft chain on the surface of the resin molded body because of reasons such as: it is difficult to adjust the temperature of the resin molded body uniformly; it is difficult to uniformly irradiate the resin molded body with ionizing radiation; or the difference in the concentration of induced intermediate active species such as radicals may be generated depending on the shape of the resin molded body (in particular, a resin molded body that has been molded into a complicated shape). Note that whether the graft chain is present on the surface portion of the resin molded body can be determined by, for example, observing the distribution of fluorine atoms contained in the graft chain, using EDX (energy dispersive X-ray) analysis by a scanning electron microscope (SEM), EPMA (electron probe microanalyzer) analysis, a scanning transmission electron microscope (STEM), a positron probe microanalyzer (PPMA) or the like.

In addition, in order to form the graft chain over the entire surface of the resin molded body, the above-described conventional method may require irradiation of radiation for a long time. In such a case, when using a resin material that is susceptible to the irradiation of radiation, for example, that is likely to be decomposed or deteriorated, the mechanical strength of the resin molded body may not be maintained. In contrast, the method of the present invention uses the molding material having the graft chain, and therefore, it may form a resin molded body having the graft chain present on the surface comparatively uniformly while suppressing decline of the mechanical strength of the resin molded body.

In particular, a device for irradiation with electron beam is used for irradiation of radiation in one embodiment of the present invention, and in such an embodiment, by lowering the accelerating voltage of the device for irradiation with electron beam to, for example, less than 1 MV, preferably 300 kV or less, more preferably 150 kV, and further preferably less than 100 kV, the graft chain is easily introduced into the surface of the molding material without impairing original physical properties of the resin (for example, strength, elastic modulus, glass transition temperature and melting point). This embodiment is useful for resin materials whose physical properties such as mechanical properties are largely altered due to irradiation of radiation.

According to the present invention, even when the degree of grafting is high, a resin molded body with little unevenness of the surface can be formed. The surface roughness can be measured by using a laser microscope, a light interference microscope, an atomic force microscope or the like.

The unevenness of the above-described resin molded body may be lowered even when the upper limit of the degree of grafting is 1000% or less, more preferably 500% or less, further preferably 200% or less, further more preferably 150% or less, particularly preferably 100% or less, more preferably 75% or less, further preferably 50% or less, further more preferably 20% or less, and particularly preferably 10% or less and the lower limit of the degree of grafting is preferably 0.001% or more, more preferably 0.01% or more, further preferably 0.05% or more, further more preferably 0.1% or more, and particularly preferably 0.2% or more. In contrast, it is difficult for the above-described conventional method to uniformly form the graft chain on the surface of the resin molded body. In addition, there may be a case where the resin molded body swells because the graft chain is formed inside the resin molded body, and unevenness may be generated on the surface of the resin molded body after forming the graft chain. Whether unevenness of the surface is small may be confirmed by observing the surface state of the resin molded body with a laser microscope, an interference microscope or the like.

According to one embodiment, the present invention can provide a resin molded body having a satisfactory solvent cracking durability. Here, the solvent cracking durability means that cracking is unlikely to occur upon the immersion in a solvent, that is, the durability against the solvent is satisfactory. The solvent cracking durability is judged by determining the critical stress for solvent cracking (hereinafter, may be described as the "critical stress") σ, and when the numerical value of σ is higher, the resin molded body has a more satisfactory solvent cracking durability.

The above-described critical stress can be measure by fixing a test sample 2 to a metal jig, as shown in FIG. 1.

For the metal jig, as shown in FIG. 1, when X axis, Y axis and Z axis are established, a metal jig whose cross section orthogonal to Z axis has a shape of a quarter of an ellipse (one of the four pieces obtained by cutting the ellipse along with its major axis and minor axis) is used. For the above-described metal jig, the one with the length x1 in the X axis direction of 10.0 cm, the length y1 in the Y axis direction of 4.0 cm and the length z1 in the Z axis direction of 1.0 cm can be used.

In particular, measurement of the above-described critical stress can be carried out as follows. At first, a test sample whose cross section has a shape of a plate (for example, 10 cm×1 cm×thickness of 0.1 cm) is provided. To the above-described metal jig, the above-described sample is fixed with a fixing member such that the sample follows the curvature of the curved surface of the metal jig (the curved surface in which the curvature of the metal jig varies continuously). The metal jig to which the above-described sample is fixed is immersed in a test solvent (for example, isopropyl alcohol (IPA), methyl ethyl ketone (MEK), mineral oils, petrolatum, glycerin, n-hexadecane or the like) maintained at a certain temperature (for example, 25° C.). The above-described metal jig was left at rest for a certain time period in a state where it is immersed in the solvent. The intersection point of the above-described minor axis (Y axis) and major axis (X axis) is defined as x=0, and among points where cracks are generated, the point with the smallest x coordinate (point 1 in FIG. 1) is defined as a crack generation point 1. The distortion ε at a crack generation point 1 (x=x2) is determined with the following formula. Here, t is the thickness (cm) of the sample before the test.

$$\varepsilon = [0.02 \times (1 - 0.0084 \times (x2)^2)^{-3/2}] \times t$$

Using the distortion ε obtained with the above-described formula and the bending elastic modulus E of the film, the stress σ at x=x2 is calculated with the following formula:

$$\sigma \text{ (kgf/cm}^2) = E \times \varepsilon$$

When the value of the stress σ calculated from the above-described formula is larger, the solvent cracking durability is judged to be more satisfactory.

In one embodiment, the resin molded body of the present invention can have a satisfactory heat resistance.

Regarding to evaluation of the heat resistance, for example, when a heat resistance index (%) calculated as follows has a higher value, it can be judged that thermal decomposition is unlikely to occur, that is, the heat resistance is satisfactory (for example, when the heat resistance index is 99% or more, it is judged that the heat resistance is satisfactory).

The above-described heat resistance index can be calculated with thermogravimetric analysis (TG). In particular, according to a certain program, the temperature of the molding material is altered (heated or cooled) and the weight change of the molding material is measured. From measurement results, the heat resistance index can be determined according to the following formula. The above-described thermogravimetric analysis can be carried out using, for example, a TGA (thermogravimetric) measuring device from Rigaku Corporation or Shimadzu Corporation.

Heat resistance index [%]=100−100×(M0−M1)/M0

In the above-described formula, M0 means the weight of the molding material before thermogravimetric analysis (before temperature elevation) and M1 means the weight of the molding material after temperature elevation.

By using olefinic monomers as the fluorine-containing compound, the heat resistance of the resin molded body may be improved more.

As described above, the method of the present invention is characterized by using the molding material including the resin material having the fluorine-containing graft chain. As such, the present invention also provides the above-described molding material including the resin material having the fluorine-containing graft chain. The molding material of the present invention is suited for, in the above-described method for producing a resin molded body of the present invention, use as a raw material of the resin molded body.

In one embodiment, the molding material of the present invention (for example, pellets) can be used (internally added) as a material to be added to a resin. When the above-described molding material is internally added to the resin, bleedout of the resin molded body to be formed may be reduced. For a method of forming a resin molded body and a method for internal addition, approaches that have been conventionally carried out may be used.

In one embodiment, the molding material of the present invention is composed of the resin material having the graft chain, and the fluorine-containing graft chain is present to a depth of at most 200 m from the surface of the molding material, and the surface area of the molding material can be 100 mm$^2$ or less.

EXAMPLES

The present invention will be described more specifically through the following Examples, but the present invention is not limited to these Examples.

Synthetic Example 1-1

In a sheet-shaped container (50 mm×50 mm×0.1 mm), 5 g of a resin material, a pellet (φ2 mm×4 mm) of a thermoplastic resin COP (cycloolefin polymer) manufactured by ZEON CORPORATION was placed and the container was evacuated. Stearyl acrylate (hereinafter, STA) monomers and perfluoroacrylate (CH$_2$—CHC(=O)O—CH$_2$CH$_2$C$_6$F$_{13}$, hereinafter, FA) monomers were mixed at a weight ratio of 1:1, and the mixture was subjected to a deoxidation treatment by bubbling for 30 minutes using nitrogen gas to obtain a monomer reagent. Two cc of the monomer reagent was injected to the sheet-shaped container and the COP pellet was immersed in the monomer reagent. Subsequently, at 35° C. and in the absence of oxygen, the surface of the pellet was irradiated with low energy electron beam using a low energy electron accelerator. Irradiation conditions were as follows: accelerating voltage of 250 kV; irradiated electron flow of 1.2 mA; conveyor speed of 10 m/min; and distance between sample and irradiation window of 100 mm. Each of the both sides of the sheet-shaped container was irradiated with one pass of low energy electron beam to allow a grafting reaction (simultaneous grafting reaction). The absorbed dose upon this was 20 kGy/pass. After the irradiation with low energy electron beam, reaction was allowed to proceed at 70° C. for further 16 hours, thereby carrying out a grafting reaction using unreacted monomers (subsequent grafting reaction) (sequential graft polymerization reactions in two stages). After the reaction, the pellet was taken out from the container and exposed to the atmosphere, and washed with acetone and HFE 7200 (manufactured by 3M) to completely remove a polymer only composed of the grafting compounds. After air-drying for 30 minutes, a drying treatment was carried out at 70° C. for 2 hours to obtain a pellet of a molding material.

Synthetic Example 1-2

A pellet of a molding material was obtained in the same way as in Synthetic Example 1-1 except that the irradiated electron flow was changed to 4.3 mA. The absorbed dose upon this was 75 kGy/pass.

Synthetic Example 2-1

In a sheet-shaped container, 5 g of a resin material, a pellet (φ2 mm×4 mm) of a thermoplastic resin COP manufactured by ZEON CORPORATION was placed and the container was evacuated. To the surface of this COP pellet, at 25° C. and in the absence of oxygen, the surface of the pellet was irradiated with low energy electron using a low energy electron accelerator. Irradiation conditions were as follows: accelerating voltage of 250 kV; electron flow of 1.2 mA; conveyor speed of 10 m/min; and distance between sample and irradiation window of 100 mm. Each of the both sides of the sheet-shaped container was irradiated with one pass of low energy electron beam. The absorbed dose upon this was 20 kGy/pass.

STA monomers and FA monomers were mixed at a weight ratio of 1:1, and the mixture was subjected to a deoxidation treatment by bubbling for 30 minutes using nitrogen gas to obtain a monomer reagent. Two cc of the monomer reagent was injected to the sheet-shaped container and the COP pellet was immersed in the monomer reagent. Subsequently, reaction was allowed at 70° C. for 16 hours, thereby carrying out a subsequent grafting reaction. After the reaction, the pellet was taken out from the container and exposed to the atmosphere, and washed with acetone and HFE 7200 (manufactured by 3M) to completely remove a polymer only composed of the grafting compounds. After air-drying for 30 minutes, a drying treatment was carried out at 70° C. for 2 hours to obtain a pellet of a molding material.

Synthetic Example 2-2

A pellet of a molding material was obtained in the same way as in Synthetic Example 2-1 except that the irradiated electron flow was changed to 4.3 mA. The absorbed dose upon this was 75 kGy/pass.

Synthetic Example 3-1

In a sheet-shaped container, 5 g of a resin material, a pellet (φ2 mm×4 mm) of a thermoplastic resin COP manufactured by ZEON CORPORATION was placed and the container was evacuated. STA monomers were subjected to a deoxidation treatment by bubbling for 20 minutes using nitrogen gas, and 2 cc of the STA monomers was injected to the sheet-shaped container. After immersing the COP pellet in the STA monomers at 70° C. for 30 minutes, 1.5 cc of FA monomers was further injected. Subsequently, at 25° C. and in the absence of oxygen, the surface of the pellet was irradiated with low energy electron using a low energy electron accelerator. Irradiation conditions were as follows: accelerating voltage of 250 kV; irradiated electron flow of 1.2 mA; conveyor speed of 10 m/min; and distance between sample and irradiation window of 100 mm. Each of the both sides of the sheet-shaped container was irradiated with one pass of low energy electron beam to allow a simultaneous grafting reaction. The absorbed dose upon this was 20 kGy/pass. After the irradiation, reaction was allowed at 70° C. for further 16 hours, thereby carrying out a grafting reaction using unreacted monomers (subsequent grafting reaction) (sequential graft polymerization reactions in two stages). After the reaction, the pellet was taken out from the container and exposed to the atmosphere, and washed with acetone and HFE 7200 (manufactured by 3M) to completely remove a polymer only composed of the grafting compounds. After air-drying for 30 minutes, a drying treatment was carried out at 70° C. for 2 hours to obtain a pellet of a molding material.

Synthetic Example 4-1

In a sheet-shaped container, 5 g of a resin material, a pellet (φ2 mm×4 mm) of a thermoplastic resin COP manufactured by ZEON CORPORATION was placed and the container was evacuated. To the sheet-shaped container, 2 cc of STA monomers was injected and the COP pellet was immersed in the STA monomers at 70° C. for 30 minutes. Subsequently, at 25° C. and in the absence of oxygen, the pellet was irradiated with low energy electron beam using a low energy electron accelerator. Irradiation conditions were as follows: accelerating voltage of 250 kV; irradiated electron flow of 1.2 mA; conveyor speed of 10 m/min; and distance between sample and irradiation window of 100 mm. Each of the both sides of the sheet-shaped container was irradiated with one pass of low energy electron beam. The absorbed dose upon this was 20 kGy/pass for each side. After the irradiation, FA monomers were subjected to a deoxidation treatment by bubbling for 20 minutes using nitrogen gas, and 1.5 cc of the FA monomers was injected to the sheet-shaped container. Subsequently, reaction was allowed at 70° C. for 16 hours, thereby carrying out a grafting reaction (subsequent grafting reaction). After the reaction, the pellet was taken out from the container and exposed to the atmosphere, and washed with acetone and HFE 7200 (manufactured by 3M) to completely remove a polymer only composed of the grafting compounds. After air-drying for 30 minutes, a drying treatment was carried out at 70° C. for 2 hours to obtain a pellet of a molding material.

Synthetic Example 5-1

Five g of a resin material, a pellet (φ2 mm×4 mm) of a thermoplastic resin COP manufactured by ZEON CORPORATION was immersed in a solution adjusted to cyclohexane (manufactured by Kishida Chemical Co., Ltd.): isopropyl alcohol (manufactured by KANTO KAGAKU) =1:9 (volume ratio) for 16 hours. Subsequently, the immersed pellet was placed in a sheet-shaped container and the container was evacuated. Then, at 25° C. and in the absence of oxygen, the surface of the pellet was irradiated with low energy electron using a low energy electron accelerator. Irradiation conditions were as follows: accelerating voltage of 250 kV; irradiated electron flow of 4.3 mA; conveyor speed of 10 m/min; and distance between sample and irradiation window of 100 mm. Each of the both sides of the sheet-shaped container was irradiated with one pass of low energy electron beam. The absorbed dose upon this was 75 kGy/pass. After the irradiation, FA monomers were subjected to a deoxidation treatment by bubbling for 30 minutes using nitrogen gas, and 2 cc of the FA monomers was injected to the sheet-shaped container. Subsequently, reaction was allowed at 70° C. for 16 hours, thereby carrying out a grafting reaction (subsequent grafting reaction). After the reaction, the pellet was taken out from the container and exposed to the atmosphere, and washed with acetone and HFE 7200 (manufactured by 3M) to completely remove a polymer only composed of the grafting compounds. After air-drying for 30 minutes, a drying treatment was carried out at 70° C. for 2 hours to obtain a pellet of a molding material.

Synthetic Example 5-2

A pellet of a molding material was obtained in the same way as in Synthetic Example 5-1 except that the mixing ratio of cyclohexane and isopropyl alcohol was changed to 2:8 (volume ratio).

Synthetic Example 5-3

A pellet of a molding material was obtained in the same way as in Synthetic Example 5-1 except that the mixing ratio of cyclohexane and isopropyl alcohol was changed to 3:7 (volume ratio).

Synthetic Example 6-1

Five g of a resin material, a pellet (φ2 mm×4 mm) of a thermoplastic resin COP manufactured by ZEON CORPORATION, was immersed in a solution adjusted to cyclohexane (manufactured by Kishida Chemical Co., Ltd.): isopropyl alcohol (manufactured by KANTO KAGAKU)= 1:9 (volume ratio) for 16 hours. Subsequently, the immersed pellet was placed in a sheet-shaped container and the container was evacuated. FA monomers were subjected to a deoxidation treatment by bubbling for 30 minutes using nitrogen gas, and 2 cc of the FA monomers was injected to the sheet-shaped container. Subsequently, at 25° C. and in the absence of oxygen, the surface of the pellet was irradiated with low energy electron using a low energy electron accelerator. Irradiation conditions were as follows: accelerating voltage of 250 kV; irradiated electron flow of 4.3 mA; conveyor speed of 10 m/min; and distance between sample and irradiation window of 100 mm. Each of the both sides of the sheet-shaped container was irradiated with one pass of low energy electron beam to carry out a grafting reaction (simultaneous grafting reaction). The absorbed dose upon this was 75 kGy/pass. After the irradiation, the container was placed in a thermostat bath and reaction was allowed at 70° C. for further 8 hours, thereby carrying out a grafting reaction using unreacted monomers (subsequent grafting reaction) (sequential graft polymerization reactions in two stages). After the reaction, the pellet was taken out from the container and exposed to the atmosphere, and washed with acetone and HFE 7200 (3M) to completely remove a polymer only composed of the grafting compounds. After air-drying for 30 minutes, a drying treatment was carried out at 70° C. for 2 hours to obtain a pellet of a molding material.

Synthetic Example 6-2

A pellet of a molding material was obtained in the same way as in Synthetic Example 6-1 except that the mixing ratio of cyclohexane and isopropyl alcohol was changed to 2:8 (volume ratio).

Synthetic Example 6-3

A pellet of a molding material was obtained in the same way as in Synthetic Example 6-2 except that the mixing ratio of cyclohexane and isopropyl alcohol was changed to 3:7 (volume ratio).

Synthetic Example 7-1-1

In the present Synthetic Example, a linear low density polyethylene (LLDPE) manufactured by Japan polyethylene Corporation was used as a resin material. In a sheet-shaped container, 5 g of a particulate sample of the above-described polyethylene (pellet, 2 mm×2 mm×2 mm) was placed and the container was evacuated. STA monomers and FA monomers were mixed at a weight ratio of 1:1, and the mixture was subjected to a deoxidation treatment by bubbling for 30 minutes with nitrogen gas. To the sheet-shaped container, 2 cc of that monomer reagent was injected and the polyethylene was immersed in the reagent. Then, at 25° C. and in the absence of oxygen, the above-described polyethylene was irradiated with low energy electron beam using a low energy electron accelerator. Irradiation conditions were as follows: accelerating voltage of 250 kV; irradiated electron flow of 1.2 mA; conveyor speed of 10 m/min; and distance between sample and irradiation window of 100 mm. Each of the both sides of the sheet-shaped container was irradiated with one pass of electron beam to allow a simultaneous grafting reaction. The absorbed dose upon this was 20 kGy/pass for each side.

Subsequently, the pellet was taken out from the container and washed with tetrahydrofuran (manufactured by KANTO KAGAKU), acetone and HFE 7200 (manufactured by 3M) to completely remove a polymer only composed of the grafting compounds. After air-drying the pellet that had been washed for 20 minutes, a drying treatment was carried out at 70° C. for 1 hour to obtain a pellet of a molding material.

Synthetic Examples 7-1-2 to 7-1-3

A pellet of a molding material was obtained in the same way as in Synthetic Example 7-1-1 except that the container after the irradiation of electron beam was placed in a thermostat bath and heated to carry out a grafting reaction using unreacted monomers (subsequent grafting reaction) (sequential graft polymerization reactions in two stages). The polymerization temperature and polymerization time for the subsequent grafting reaction are as shown in Table 2 and Table 5.

Synthetic Example 7-2-1

A pellet of a molding material was obtained in the same way as in Synthetic Example 7-1-1 except that the conveyor speed was changed to 20 m/min and the absorbed dose was 10 kGy/pass.

Synthetic Example 7-2-2 to Synthetic Example 7-2-3

A pellet of a molding material was obtained in the same way as in Synthetic Example 7-1-2 and Synthetic Example 7-1-3 except that the conveyor speed was changed to 20 m/min and the absorbed dose was 10 kGy/pass. The polymerization temperature and polymerization time for the subsequent grafting reaction are as shown in Tables 2 and 5.

Synthetic Example 7-3-1

A pellet of a molding material was obtained in the same way as in Synthetic Example 7-1-1 except that a low density polyethylene (LDPE) was used instead of the LLDPE.

Synthetic Example 7-3-2 to Synthetic Example 7-3-4

A pellet of a molding material was obtained in the same way as in Synthetic Example 7-1-2 except that a LDPE was used instead of the LLDPE. The polymerization temperature and polymerization time for the subsequent grafting reaction are as shown in Table 2.

Synthetic Example 7-4-1

A pellet of a molding material was obtained in the same way as in Synthetic Example 7-3-1 except that the conveyor speed was changed to 20 m/min and the absorbed dose was 10 kGy/pass.

Synthetic Example 7-4-2 to Synthetic Example 7-4-4

A pellet of a molding material was obtained in the same way as in Synthetic Example 7-3-2 except that the conveyor speed was changed to 20 m/min and the absorbed dose was 10 kGy/pass. The polymerization temperature and polymerization time for the subsequent grafting reaction are as shown in Table 2.

Synthetic Example 7-5-1

A pellet of a molding material was obtained in the same way as in Synthetic Example 7-2-1 except that a high density polyethylene (HDPE) was used instead of the LLDPE.

Synthetic Example 7-5-2 to Synthetic Example 7-5-3

A pellet of a molding material was obtained in the same way as in Synthetic Example 7-2-2 except that a HDPE was used instead of the LLDPE. The polymerization temperature and polymerization time for the subsequent grafting reaction are as shown in Table 2.

Synthetic Example 8-1-1

As a resin material, a LLDPE was used. In a sheet-shaped container, 5 g of a particulate sample of the above-described polyethylene (2 mm×2 mm×2 mm) was placed and the container was evacuated. Subsequently, at 25° C. and in the absence of oxygen, the polyethylene was irradiated with low energy electron beam using a low energy electron accelerator. Irradiation conditions were as follows: accelerating voltage of 250 kV; irradiated electron flow of 1.2 mA;

conveyor speed of 10 m/min; and distance between sample and irradiation window of 100 mm. Each of the both sides of the sheet-shaped container was irradiated with one pass of electron beam. The absorbed dose upon this was 20 kGy/pass.

STA monomers and FA monomers were mixed at a weight ratio of 1:1, and the mixture was subjected to a deoxidation treatment by bubbling for 30 minutes with nitrogen gas. To the sheet-shaped container after the irradiation of electron beam, 2 cc of that monomer reagent was injected and the particulate polyethylene was immersed.

Subsequently, the pellet was taken out from the container and washed with tetrahydrofuran (manufactured by KANTO KAGAKU), acetone and HFE 7200 (3M) to completely remove a polymer only composed of the grafting compounds. After air-drying the pellet that had been washed for 20 minutes, a drying treatment was carried out at 70° C. for 1 hour to obtain a pellet of a molding material.

Synthetic Example 8-1-2 to Synthetic Example 8-1-3

A pellet of a molding material was obtained in the same way as in Synthetic Example 8-1-1 except that the container after the irradiation of electron beam was heated to carry out a subsequent grafting reaction. The polymerization temperature and polymerization time for the subsequent grafting reaction are as shown in Table 2.

Synthetic Example 8-2-1

A pellet of a molding material was obtained in the same way as in Synthetic Example 8-1-1 except that the conveyor speed was changed to 20 m/min and the absorbed dose was 10 kGy/pass.

Synthetic Example 8-2-2

A pellet of a molding material was obtained in the same way as in Synthetic Example 8-1-2 except that the conveyor speed was changed to 20 m/min and the absorbed dose was 10 kGy/pass. The polymerization temperature and polymerization time for the subsequent grafting reaction are as shown in Table 2.

Synthetic Example 8-3-1

A pellet of a molding material was obtained in the same way as in Synthetic Example 8-1-1 except that a LDPE was used instead of the LLDPE.

Synthetic Example 8-3-2

A pellet of a molding material was obtained in the same way as in Synthetic Example 8-1-2 except that a LDPE was used instead of the LLDPE. The polymerization temperature and polymerization time for the subsequent grafting reaction are as shown in Table 2.

Synthetic Example 8-4-1

A pellet of a molding material was obtained in the same way as in Synthetic Example 8-3-1 except that the conveyor speed was changed to 20 m/min and the absorbed dose was 10 kGy/pass.

Synthetic Example 8-4-2

A pellet of a molding material was obtained in the same way as in Synthetic Example 8-3-2 except that the conveyor speed was changed to 20 m/min and the absorbed dose was 10 kGy/pass. The polymerization temperature and polymerization time for the subsequent grafting reaction are as shown in Table 2.

Synthetic Example 8-5-1

A pellet of a molding material was obtained in the same way as in Synthetic Example 8-2-1 except that a HDPE was used instead of the LLDPE.

Synthetic Example 8-5-2 to Synthetic Example 8-5-3

A pellet of a molding material was obtained in the same way as in Synthetic Example 8-2-2 except that a HDPE was used instead of the LLDPE. The polymerization temperature and polymerization time for the subsequent grafting reaction are as shown in Table 2.

Synthetic Example 9-1

A pellet was obtained in the same way as in Synthetic Example 7-1-2 except that only STA monomers were used instead of the STA monomers and the FA monomers. In the subsequent grafting reaction, the reaction temperature was 60° C. and the reaction time was 16 hours.

Synthetic Example 10-1

A pellet was obtained in the same way as in Synthetic Example 9-1 except that a COP was used as the resin material instead of the LLDPE.

Synthetic Example 11-1-1

A pellet of a molding material was obtained in the same way as in Synthetic Example 1-1 except that 1-hexene and perfluorohexylethylene ($CF_3CF_2CF_2CF_2CF_2CF_2CH=CH_2$) were used instead of the STA monomers and the FA monomers.

Synthetic Example 11-1-2

A pellet of a molding material was obtained in the same way as in Synthetic Example 1-2 except that 1-hexene and perfluorohexylethylene were used instead of the STA monomers and the FA monomers.

Synthetic Example 11-1-3

A pellet of a molding material was obtained in the same way as in Synthetic Example 1-2 except that 1-hexene and perfluorohexylethylene were used instead of the STA monomers and the FA monomers, and that 2 passes of low energy electron beam were irradiated.

Synthetic Example 12-1-1

A pellet of a molding material was obtained in the same way as in Synthetic Example 1-2 except that 1-hexene and perfluorohexylethylene were used instead of the STA monomers and the FA monomers, and that 4 passes of low energy electron beam were irradiated in the simultaneous grafting reaction while reaction was not allowed at 70° C. for 16 hours after the irradiation of low energy electron beam (that is, the subsequent grafting reaction was not carried out).

Synthetic Example 12-1-2

A pellet of a molding material was obtained in the same way as in Synthetic Example 1-2 except that 1-hexene and perfluorohexylethylene were used instead of the STA monomers and the FA monomers, and that 4 passes of low energy electron beam were irradiated.

Synthetic Example 13-1-1

A pellet of a molding material was obtained in the same way as in Synthetic Example 1-2 except that 1-hexene and perfluorohexylethylene were used instead of the STA monomers and the FA monomers, and that 6 passes of low energy electron beam were irradiated in the simultaneous grafting reaction while reaction was not allowed at 70° C. for 16 hours after the irradiation of low energy electron beam (that is, the subsequent grafting reaction was not carried out).

Synthetic Example 13-1-2

A pellet of a molding material was obtained in the same way as in Synthetic Example 1-2 except that 1-hexene and perfluorohexylethylene were used instead of the STA monomers and the FA monomers, and that 6 passes of low energy electron beam were irradiated.

(Molding Method A)

After weighing 0.35 g of a pellet of the modified raw material for molding, obtained in Synthetic Examples, it was placed in a frame of a PTFE sheet that had been hollowed out with 4 cm×2 cm and that had a thickness of 100 μm. Then, this was sandwiched with silicon wafers covered with a PTFE sheet, and while a load of 1 kg was applied, it was heated at 260° C. for 5 minutes to mold a molded sheet.

(Molding Method B)

After heating a pellet obtained in Synthetic Examples, using a melt flow rate (MFR) device under the following conditions, it was discharged to form a strand with a diameter of 4 mm. To 2 g of the strand that had been passed through the MFR device twice, a load of 1 kg was applied and the strand was heated at 260° C. for 5 minutes, in the same way as Example A1-1, and a molded sheet was molded.

(Conditions for MFR)

MFR was carried out by using (Melt Indexer G-01) from Toyo Seiki Seisaku-sho, Ltd. and by charging about 3 kg of a pellet into a cylinder maintained at a molding temperature of 190° C. under a load of 5 kg.

Example A1-1 to Example A8-5-3

Using the pellet obtained in each of Synthetic Example 1-1 to Synthetic Example 8-5-3, a molded sheet was molded according to the molding method A.

Example A9-1-1 to Example A9-1-2

Using the pellet obtained in each of Synthetic Example 11-1-1 to Synthetic Example 11-1-2, a molded sheet was molded according to the molding method A.

Examples B1-1, B2-1, B3-1 and B7-1-1 to B7-2-2

Using the pellet obtained in each of Synthetic Example 1-1, Synthetic Example 2-1, Synthetic Example 3-1 and Synthetic Examples 7-1-1 to 7-2-2, a molded sheet was molded according to the molding method B.

Examples B11-1-1 to B11-1-3, B12-1-1 to B12-1-2 and B13-1-1 to B13-1-2

Using the pellet obtained in each of Synthetic Examples 11-1-1 to 11-1-3, 12-1-1 to 12-1-2 and 13-1-1 to 13-1-2, a molded sheet was molded according to the molding method B.

Comparative Example B9-1

Using the pellet obtained in Synthetic Example 9-1, a molded sheet was molded according to the molding method B. The obtained molded sheet was heated for 1 hour in a heating oven set at a temperature, 3° C. lower than the glass transition temperature (90° C.).

Comparative Example B10-1

Using the pellet obtained in Synthetic Example 10-1, a molded sheet was molded according to the molding method B. The obtained molded sheet was heated for 1 hour in a heating oven set at a temperature, 3° C. lower than the glass transition temperature (90° C.).

(Measurement of Contact Angle)

Onto the molded sheets molded in Examples and Comparative Examples, n-hexadecane was dropped, and the contact angle was measured. The measurement of the contact angle was performed using a contact angle measuring device (manufactured by Kyowa Interface Science, Inc.) and 2 μL of n-hexadecane under an environment of 25° C. The measurement results are shown in Tables 1 to 6.

(Measurement of Degree of grafting)

The degree of grafting (Dg) was calculated by measuring the weight change of the resin material before and after the graft polymerization reaction and by using the following formula:

$$\text{Degree of grafting: } Dg[\%]=(W_1-W_0)/W_0\times 100$$

wherein $W_0$ is the weight of the resin material before the graft polymerization and $W_1$ is the weight of the resin material after the graft polymerization.

(Measurement of Co-Grafting Mass Ratio)

The co-grafting mass ratio (the mass ratio of constituent units derived from the fluorine-containing compound:the mass ratio of constituent units derived from the non-fluorinated compound) was determined as follows:

$$\text{Mass ratio of constituent units derived from fluorine-containing compound}=(\text{degree of grafting of fluorine-containing compound}/Dg)\times 100$$

$$\text{Mass ratio of constituent units derived from non-fluorinated compound}=(\text{degree of grafting of non-fluorinated compound}/Dg)\times 100$$

The above-described degree of grafting of the fluorine-containing compound was determined with an oxygen flask combustion method and an ion selective electrode method.

The flask combustion method was carried out as follows. A combustion flask made of hard glass with a volume of 500 mL was used. A paper for wrapping a sample was obtained by dividing a filter paper of JIS 5A with a diameter of 110 mm into eight, fan-shaped pieces, and by removing a part thereof that was on the center side from the line linking middle points of radii, leaving a fuse part. The paper had a weight of about 0.1 g. Next, about 50 mL of an absorbing liquid was charged in the flask. Its compositional features were the same as the eluent. The liquid volume was adjusted such that the fluorine concentration after absorbing the combustion gas would be about 9 mg/L. Then, 500 to 700 μg of the sample was enveloped with the filter paper, and after replacing the inside of the flask with oxygen, it was combusted. The flask was shaken for about 5 seconds and the absorbing liquid was collected.

The above-described degree of grafting of the non-fluorinated compound was determined by calculating the difference, using the above-described degree of grafting (Dg) as the total value of the degree of grafting of the fluorine-containing compound and the degree of grafting of the non-fluorinated compound.

(Solvent Cracking Durability)

For the solvent cracking durability, it was judged that the larger the value of critical stress is, the more satisfactory the durability against a solvent is.

The critical stress was determined with the following method. At first, a test sample whose cross section had a shape of a plate (10 cm×1 cm×thickness of 0.1 cm) was provided. In addition, for a metal jig, the one with the length x1 in the X axis direction of 10.0 cm, the length y1 in the Y axis direction of 4.0 cm and the length z1 in the Z axis direction of 1.0 cm was used. To the above-described metal jig, the above-described sample was fixed with a fixing member 3 such that the sample followed the curvature of the curved surface of the metal jig (the curved surface in which the curvature of the metal jig varied continuously). Note that the width (z2) in the Z axis direction of the sample was 0.6 cm. The metal jig to which the above-described sample was fixed was immersed in a test solvent (petrolatum) maintained at 25° C. The above-described metal jig was left at rest for 1 hour in a state where it was immersed in the solvent. The distortion s at a crack generation point 1 (x=x2) was determined with the following formula. Note that confirmation of a crack was visually performed.

$$\varepsilon = [0.02 \times (1 - 0.0084 \times (x2)^2)^{-3/2}] \times t$$

wherein t is the thickness of the sample before the test (0.1 cm).

Using the distortion s obtained with the above-described formula and the bending elastic modulus E of the film, the stress σ at x=x2 was calculated with the following formula:

$$\sigma \text{ (kgf/cm}^2) = E \times \varepsilon$$

wherein, for E, the bending elastic modulus of COP, E=2500 MPa was used.

(Evaluation of Heat Resistance)

For evaluation of heat resistance, a heat resistance index (%) was calculated from measurement results of thermogravimetric analysis, as described above, and when the obtained heat resistance index is 99% or more, evaluation as a satisfactory heat resistance (evaluation A) was given, and when it is less than 99%, evaluation as a poor heat resistance (evaluation B) was given.

At first, a sample for thermogravimetric analysis was provided. The weight of the sample prior to the thermogravimetric analysis was measured, and this measured value was defined as M0.

For the above-described sample, the temperature was elevated under an air atmosphere, using a simultaneous thermogravimetry differential thermal analyzer TG/DTA 7200 (from Hitachi High-Tech Science Corporation).

When the resin material is PE, the temperature was elevated from 25° C. to 600° C. at a rate of 10° C./minute. In this case, the weight as of 230° C. was defined as M1.

When the resin material is COP, the temperature was elevated from 25° C. to 600° C. at a rate of 10° C./minute. In this case, the weight as of 290° C. was defined as M1.

Heat resistance index [%]=100−100×($M0$−$M1$)/$M0$

Evaluation results for each physical property are shown in Tables 1 to 6. In Tables, "—" indicates unmeasured.

TABLE 1

| | Pellet used | Degree of grafting (%) | Contact angle (degree) | Co-grafting mass ratio* (fluorine-containing: non-fluorinated) | Heat resistance |
|---|---|---|---|---|---|
| Example A1-1 | Synthetic Example 1-1 | 4.2 | 62.5 | 16.4:83.6 | B |
| Example A1-2 | Synthetic Example 1-2 | 5.0 | 74.9 | 17.7:82.3 | — |
| Example A2-1 | Synthetic Example 2-1 | 1.1 | 16.0 | 5.3:947 | B |
| Example A2-2 | Synthetic Example 2-2 | 3.3 | 49.2 | — | — |
| Example A3-1 | Synthetic Example 3-1 | 5.1 | 76.3 | 10.2:89.8 | — |
| Example A4-1 | Synthetic Example 4-1 | 2.7 | 40.9 | — | — |
| Example A5-1 | Synthetic Example 5-1 | 3.4 | 50.3 | — | — |
| Example A5-2 | Synthetic Example 5-2 | 2.8 | 41.9 | — | — |
| Example A5-3 | Synthetic Example 5-3 | 2.2 | 32.5 | — | — |
| Example A6-1 | Synthetic Example 6-1 | 2.7 | 40.0 | — | — |
| Example A6-2 | Synthetic Example 6-2 | 4.7 | 70.0 | — | — |
| Example A6-3 | Synthetic Example 6-3 | 1.3 | 19.6 | — | — |

*: Co-grafting mass ratio between constituent units derived from the fluorine-containing compound and constituent units derived from the non-fluorinated compound.

TABLE 2

| | Pellet used | Polymerization temperature/ polymerization time for subsequent grafting reaction | Degree of grafting (%) | Contact angle (degree) | Heat resistance |
|---|---|---|---|---|---|
| Example A7-1-1 | Synthetic Example 7-1-1 | — | 5.5 | 63.5 | A |
| Example A7-1-2 | Synthetic Example 7-1-2 | 60° C./8 hours | 5.7 | 66.2 | — |
| Example A7-1-3 | Synthetic Example 7-1-3 | 70° C./8 hours | 6.8 | 79.1 | A |
| Example A7-2-1 | Synthetic Example 7-2-1 | — | 5.1 | 59.4 | — |
| Example A7-2-2 | Synthetic Example 7-2-2 | 50° C./8 hours | 5.2 | 60.5 | — |
| Example A7-2-3 | Synthetic Example 7-2-3 | 70° C./8 hours | 6.4 | 74.7 | — |
| Example A7-3-1 | Synthetic Example 7-3-1 | — | 5.2 | 61.0 | — |

TABLE 2-continued

| | Pellet used | Polymerization temperature/ polymerization time for subsequent grafting reaction | Degree of grafting (%) | Contact angle (degree) | Heat resistance |
|---|---|---|---|---|---|
| Example A7-3-2 | Synthetic Example 7-3-2 | 60° C./8hours | 6.0 | 70.1 | — |
| Example A7-3-3 | Synthetic Example 7-3-3 | 70° C./8 hours | 6.7 | 78.2 | — |
| Example A7-3-4 | Synthetic Example 7-3-4 | 70° C./16 hours | 6.8 | 78.9 | — |
| Example A7-4-1 | Synthetic Example 7-4-1 | — | 0.8 | 8.9 | — |
| Example A7-4-4 | Synthetic Example 7-4-2 | 60° C./8 hours | 5.8 | 67.7 | — |
| Example A7-4-3 | Synthetic Example 7-4-3 | 70° C./8 hours | 6.7 | 77.7 | — |
| Example A7-4-2 | Synthetic Example 7-4-4 | 70° C./16 hours | 7.1 | 82.1 | — |
| Example A7-5-1 | Synthetic Example 7-5-1 | — | 1.0 | 12.0 | — |
| Example A7-5-2 | Synthetic Example 7-5-2 | 60° C./8 hours | 4.3 | 50.3 | — |
| Example A7-5-3 | Synthetic Example 7-5-3 | 70° C./8 hours | 3.9 | 45.9 | — |
| Example A8-1-1 | Synthetic Example 8-1-1 | — | 0.9 | 10.0 | — |
| Example A8-1-2 | Synthetic Example 8-1-2 | 70° C./8 hours | 3.1 | 36.1 | — |
| Example A8-1-3 | Synthetic Example 8-1-3 | 70° C./16 hours | 4.9 | 56.6 | — |
| Example A8-2-1 | Synthetic Example 8-2-1 | — | 0.9 | 10.1 | — |
| Example A8-2-2 | Synthetic Example 8-2-2 | 70° C./8 hours | 2.3 | 27.1 | — |
| Example A8-3-1 | Synthetic Example 8-3-1 | — | 0.8 | 9.5 | — |
| Example A8-3-2 | Synthetic Example 8-3-2 | 70° C./16 hours | 1.9 | 22.4 | — |
| Example A8-4-1 | Synthetic Example 8-4-1 | — | 0.5 | 5.4 | — |
| Example A8-4-2 | Synthetic Example 8-4-2 | 70° C./16 hours | 4.5 | 51.9 | — |
| Example A8-5-1 | Synthetic Example 8-5-1 | — | 0.5 | 5.3 | — |
| Example A8-5-2 | Synthetic Example 8-5-2 | 60° C./8 hours | 0.7 | 7.6 | — |
| Example A8-5-3 | Synthetic Example 8-5-3 | 70° C./16 hours | 0.9 | 10.5 | — |

In the above-described Table 2, "-" indicates that the subsequent grafting reaction is not carried out.

TABLE 3

| | Pellet used | Polymerization temperature/ polymerization time for subsequent grafting reaction | Degree of grafting (%) | Contact angle (degree) | Co-grafting mass ratio* (fluorine-containing:non-fluorinated) | Heat resistance |
|---|---|---|---|---|---|---|
| Example A9-1-1 | Synthetic Example 11-1-1 | 70° C./16 hours | 1.40 | 23.7 | 3.0/97.0 | A |
| Example A9-1-2 | Synthetic Example 11-1-2 | 70° C./16 hours | 1.47 | 21.3 | 2.9/97.1 | A |

*Co-grafting mass ratio between constituent units derived from the fluorine-containing compound and constituent units derived from the non-fluorinated compound.

TABLE 4

| | Pellet used | Degree of grafting (%) | Contact angle (degree) |
|---|---|---|---|
| Example B1-1 | Synthetic Example 1-1 | 3.7 | 55.9 |
| Example B2-1 | Synthetic Example 2-1 | 1.0 | 14.8 |
| Example B3-1 | Synthetic Example 3-1 | 3.1 | 46.2 |

TABLE 5

| | Pellet used | Polymerization temperature/ polymerization time for subsequent grafting reaction | Degree of grafting (%) | Contact angle (degree) | Critical stress for solvent cracking [kgf/cm²] |
|---|---|---|---|---|---|
| Example B7-1-1 | Synthetic Example 7-1-1 | — | 2.9 | 34.2 | — |
| Example B7-1-3 | Synthetic Example 7-1-3 | 70° C./8 hours | 6.0 | 69.7 | — |
| Example B7-2-1 | Synthetic Example 7-2-1 | — | 2.1 | 24.2 | — |
| Example B7-2-2 | Synthetic Example 7-2-2 | 70° C./8 hours | 3.5 | 40.9 | — |
| Comparative Example B9-1 | Synthetic Example 9-1 | 60° C./16 hours | 0.6 | 7.3 | — |
| Comparative Example B10-1 | Synthetic Example 10-1 | 60° C./16 hours | 0.6 | 9.4 | 66.1 |

In the above-described Table 5, "-" indicates that the subsequent grafting reaction is not carried out.

TABLE 6

| Pellet used | | Polymerization temperature/ polymerization time for subsequent grafting reaction | Degree of grafting (%) | Contact angle (degree) | Co-grafting mass ratio* (fluorine-containing:non-fluorinated) | Critical stress for solvent cracking [kgf/cm²] | Heat resistance |
|---|---|---|---|---|---|---|---|
| Example B11-1-1 | Synthetic Example 11-1-1 | 70° C./ 16 hours | 1.40 | 21.1 | 3:97 | 66.0 | A |
| Example B11-1-2 | Synthetic Example 11-1-2 | 70° C./ 16 hours | 1.47 | 31.8 | 2.9:97.1 | 62.0 | A |
| Example B11-1-3 | Synthetic Example 11-1-3 | 70° C./ 16 hours | 0.78 | 22.6 | 7.7:92.3 | 58.1 | A |
| Example B12-1-1 | Synthetic Example 12-1-1 | — | 0.21 | 34.2 | — | 98.8 | — |
| Example B12-1-2 | Synthetic Example 12-1-2 | 70° C./ 16 hours | 1.23 | 21.6 | 4.9:95.1 | 107.4 | A |
| Example B13-1-1 | Synthetic Example 13-1-1 | — | 1.33 | 34.4 | — | 89.8 | — |
| Example B13-1-2 | Synthetic Example 13-1-2 | 70° C./ 16 hours | 1.48 | 27.0 | — | 98.0 | — |

*Co-grafting mass ratio between constituent units derived from the fluorine-containing compound and constituent units derived from the non-fluorinated compound.

In the above-described Table 6, "-" in the column of "polymerization temperature/polymerization time for subsequent grafting reaction" indicates that the subsequent grafting reaction is not carried out, and "-" in the column of "co-grafting mass ratio" indicates unmeasured.

INDUSTRIAL APPLICABILITY

The method of the present invention can be used for production of a variety of resin molded bodies that require oil-repellency, water-repellency and the like, such as medical syringe barrels, vial bottles, molds for contact lens, surface protective films for portable terminals, cover glasses for organic EL or water vapor barrier out-cell members in organic EL isotropic films, mold release molding members for nano-imprinting technique, life-related containers and packaging members, drainage members in bathrooms, and yarn materials for clothes composed of synthetic chemical materials. In addition, the method of the present invention can be used for production of not only resin molded bodies that require oil-repellency and water-repellency, but also resin molded bodies that require lubricity and mold releasing durability, such as watch bands and surface members including indicating elements. Furthermore, the method of the present invention can produce resin molded bodies that can be used as household articles, stationery, interior materials, toys, playthings, sanitary goods, medical supplies or the like and have a low surface energy, and therefore, it can also be used for production of resin molded bodies as water-repellent coatings that would be attached to side walls, roofs or the like of buildings, or for impartment of water-repellent films through application to existing structures such as port facilities, watercrafts, side walls, roofs or the like of buildings.

REFERENCE SIGNS LIST

1: CRACK GENERATION POINT
2: TEST SAMPLE
3: FIXING MEMBER

The present invention includes following embodiments:
Embodiment 1.

A molding material comprising a resin material that has a graft chain containing constituent units derived from a fluorine-containing compound and a non-fluorinated compound. Embodiment 2.

The molding material according to Embodiment 1, wherein the fluorine-containing compound comprises at least one selected from the group consisting of a fluorine-containing acrylate ester represented by formula (1):

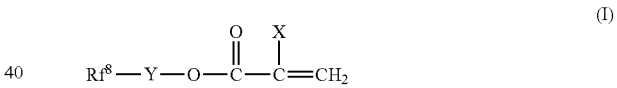

wherein
X is a hydrogen atom, a methyl group, a fluorine atom, a chlorine atom, a bromine atom, an iodine atom, a $CFX^1X^2$ group, a cyano group, a linear or branched fluoroalkyl group having 1 to 21 carbon atoms, a substituted or unsubstituted benzyl group, or a substituted or unsubstituted phenyl group;

$X^1$ and $X^2$, independently of each other, represent a hydrogen atom, a fluorine atom, a chlorine atom, a bromine atom or an iodine atom;

Y is an aliphatic group having 1 to 10 carbon atoms, an aromatic group or cycloaliphatic group having 6 to 10 carbon atoms, a —$CH_2CH_2N(R^1)SO_2$— group, or a —$CH_2CH(OY^1)CH_2$— group;

$R^1$ is an alkyl group having 1 to 4 carbon atoms;

$Y^1$ is a hydrogen atom or an acetyl group; and $Rf^8$ is a linear or branched fluoroalkyl group or fluoroalkenyl group having 1 to 6 carbon atoms, a compound represented by $Rf'CH=CH_2$, wherein $Rf'$ is a perfluoroalkyl group, and a perfluoroolefin.

Embodiment 3

The molding material according to Embodiment 1 or 2, wherein the molding material is in the shape of a pellet.

Embodiment 4

A method for producing a resin molded body, comprising:
irradiating a resin material with radiation to introduce a graft chain containing constituent units derived from a fluorine-containing compound and constituent units derived from a non-fluorinated compound to the resin material to obtain a molding material and molding the obtained molding material.

Embodiment 5

The method according to Embodiment 4, which further comprises contacting the resin material before the irradiation with ionizing radiation with the fluorine-containing compound and/or the non-fluorinated compound.

Embodiment 6

The method according to Embodiment 4 or 5, wherein the fluorine-containing compound comprises at least one selected from the group consisting of a fluorine-containing acrylate ester represented by formula (1):

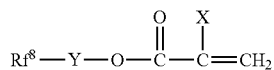
(I)

wherein
X is a hydrogen atom, a methyl group, a fluorine atom, a chlorine atom, a bromine atom, an iodine atom, a $CFX^1X^2$ group, a cyano group, a linear or branched fluoroalkyl group having 1 to 21 carbon atoms, a substituted or unsubstituted benzyl group, or a substituted or unsubstituted phenyl group;
$X^1$ and $X^2$, independently of each other, represent a hydrogen atom, a fluorine atom, a chlorine atom, a bromine atom or an iodine atom;
Y is an aliphatic group having 1 to 10 carbon atoms, an aromatic group or cycloaliphatic group having 6 to 10 carbon atoms, a $-CH_2CH_2N(R^1)SO_2-$ group, or a $-CH_2CH(OY^1)CH_2-$ group;
$R^1$ is an alkyl group having 1 to 4 carbon atoms;
$Y^1$ is a hydrogen atom or an acetyl group; and
$Rf^8$ is a linear or branched fluoroalkyl group or fluoroalkenyl group having 1 to 6 carbon atoms,
a compound represented by $Rf^9CH=CH_2$, wherein $Rf^9$ is a perfluoroalkyl group, and a perfluoroolefin.

Embodiment 7

A method for producing a resin molded body, comprising:
the molding material according to any one of Embodiments 1 to 3 is molded by a molding method including heating treatment to segregate the graft chain on a surface of the resin molded body.

The invention claimed is:
1. A molding material comprising a resin material that has a graft chain containing constituent units derived from a fluorine-containing compound and a non-fluorinated compound;
wherein
a depth of the graft chain is 1 to 95% of the molding material,
the molding material is in the shape of a pellet, and
the resin material is in the shape of a pellet.

2. The molding material according to claim 1, wherein the fluorine-containing compound comprises at least one selected from the group consisting of a fluorine-containing acrylate ester represented by formula (1):

(I)

wherein
X is a hydrogen atom, a methyl group, a fluorine atom, a chlorine atom, a bromine atom, an iodine atom, a $CFX^1X^2$ group, a cyano group, a linear or branched fluoroalkyl group having 1 to 21 carbon atoms, a substituted or unsubstituted benzyl group, or a substituted or unsubstituted phenyl group;
$X^1$ and $X^2$, independently of each other, represent a hydrogen atom, a fluorine atom, a chlorine atom, a bromine atom or an iodine atom;
Y is an aliphatic group having 1 to 10 carbon atoms, an aromatic group or cycloaliphatic group having 6 to 10 carbon atoms, a $-CH_2CH_2N(R^1)SO_2-$ group, or a $-CH_2CH(OY^1)CH_2-$ group;
$R^1$ is an alkyl group having 1 to 4 carbon atoms;
$Y^1$ is a hydrogen atom or an acetyl group; and
$Rf^8$ is a linear or branched fluoroalkyl group or fluoroalkenyl group having 1 to 6 carbon atoms,
a compound represented by $Rf^9CH=CH_2$, wherein $Rf^9$ is a perfluoroalkyl group, and a perfluoroolefin.

3. A method for producing a resin molded body, comprising:
contacting a resin material before the irradiation with ionizing radiation with a fluorine-containing compound and/or a non-fluorinated compound; and
irradiating the resin material with radiation to introduce a graft chain containing constituent units derived from the fluorine-containing compound and constituent units derived from the non-fluorinated compound to the resin material to obtain a molding material and molding the obtained molding material;
wherein
the molding material is in the shape of a pellet, and
the resin material is in the shape of a pellet.

4. The method according to claim 3, wherein the fluorine-containing compound comprises at least one selected from the group consisting of a fluorine-containing acrylate ester represented by formula (1):

(I)

wherein
X is a hydrogen atom, a methyl group, a fluorine atom, a chlorine atom, a bromine atom, an iodine atom, a $CFX^1X^2$ group, a cyano group, a linear or branched fluoroalkyl group having 1 to 21 carbon atoms, a substituted or unsubstituted benzyl group, or a substituted or unsubstituted phenyl group;
$X^1$ and $X^2$, independently of each other, represent a hydrogen atom, a fluorine atom, a chlorine atom, a bromine atom or an iodine atom;

Y is an aliphatic group having 1 to 10 carbon atoms, an aromatic group or cycloaliphatic group having 6 to 10 carbon atoms, a —CH$_2$CH$_2$N(R$^1$)SO$_2$— group, or a —CH$_2$CH(OY$^1$)CH$_2$— group;

R$^1$ is an alkyl group having 1 to 4 carbon atoms;

Y$^1$ is a hydrogen atom or an acetyl group; and

Rf$^8$ is a linear or branched fluoroalkyl group or fluoroalkenyl group having 1 to 6 carbon atoms, a compound represented by Rf$^{j}$CH═CH$_2$, wherein Rf$^{j}$ is a perfluoroalkyl group, and a perfluoroolefin.

5. A method for producing a resin molded body, comprising:
the molding material according to claim 1 is molded by a molding method including heating treatment to segregate the graft chain on a surface of the resin molded body.

6. The molding material according to claim 1, wherein the non-fluorinated compound is a group selected from a compound having a moiety reactive with radicals, a compound in which a part of the molecule or molecular chain is desorbed to ionize, or a compound having a moiety to be intermediate active species.

7. The method according to claim 3, wherein the non-fluorinated compound is a group selected from a compound having a moiety reactive with radicals, a compound in which a part of the molecule or molecular chain is desorbed to ionize, or a compound having a moiety to be intermediate active species.

8. The molding material according to claim 1, wherein the graft chain is present to a maximum depth of 20 mm from a surface of the molding material.

9. The molding material according to claim 1, wherein the fluorine-containing compound is represented by one or more of formula (1) to (6) below:

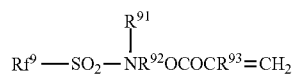 (1)

Rf$^9$—SO$_2$—NR$^{92}$OCOCR$^{93}$═CH$_2$

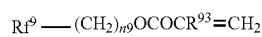 (2)

Rf$^9$—(CH$_2$)$_{n9}$OCOCR$^{93}$═CH$_2$

 (3)

Rf$^9$—CONR$^{92}$OCOCR$^{93}$═CH$_2$

 (4)

Rf$^9$—CH$_2$CHCH$_2$OCOCR$^{93}$═CH$_2$ (with OH)

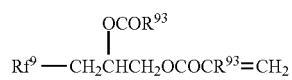 (5)

Rf$^9$—CH$_2$CHCH$_2$OCOCR$^{93}$═CH$_2$ (with OCOR$^{93}$)

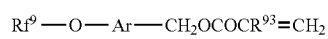 (6)

Rf$^9$—O—Ar—CH$_2$OCOCR$^{93}$═CH$_2$ wherein:
Rf$^9$ represents a perfluoroalkyl group having 1 to 6 carbon atoms;
R$^{91}$ represents a hydrogen atom or an alkyl group having 1 to 10 carbon atoms;
R$^{92}$ represents an alkylene group having 1 to 10 carbon atoms;
R$^{93}$ represents a hydrogen atom or a methyl group;
n9 represents an integer of 1 to 10; and
Ar represents an aryl group optionally having a substituent.

10. The molding material according to claim 1, wherein the fluorine-containing compound contains one or more the following compounds:

CF$_3$(CF$_2$)$_5$(CH$_2$)OCOCH═CH$_2$,
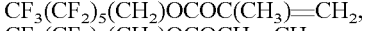
CF$_3$(CF$_2$)$_5$(CH$_2$)OCOC(CH$_3$)═CH$_2$,
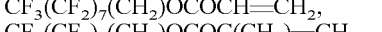
CF$_3$(CF$_2$)$_7$(CH$_2$)OCOCH═CH$_2$,
CF$_3$(CF$_2$)$_7$(CH$_2$)OCOC(CH$_3$)═CH$_2$,
(CF$_3$)$_2$CF(CF$_2$)$_3$(CH$_2$)$_2$OCOCH═CH$_2$,
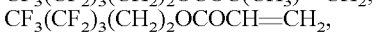
CF$_3$(CF$_2$)$_3$(CH$_2$)$_2$OCOC(CH$_3$)═CH$_2$,
CF$_3$(CF$_2$)$_3$(CH$_2$)$_2$OCOCH═CH$_2$,
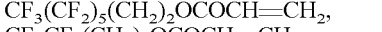
CF$_3$(CF$_2$)$_5$(CH$_2$)$_2$OCOC(CH$_3$)═CH$_2$,
CF$_3$(CF$_2$)$_5$(CH$_2$)$_2$OCOCH═CH$_2$,
CF$_3$CF$_2$(CH$_2$)$_2$OCOCH═CH$_2$,
CF$_3$(CF$_2$)$_3$SO$_2$N(CH$_3$)(CH$_2$)$_2$OCOCH═CH$_2$,
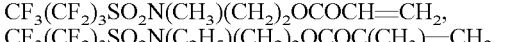
CF$_3$(CF$_2$)$_3$SO$_2$N(C$_2$H$_5$)(CH$_2$)$_2$OCOC(CH$_3$)═CH$_2$,
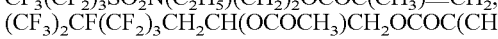
(CF$_3$)$_2$CF(CF$_2$)$_3$CH$_2$CH(OCOCH$_3$)CH$_2$OCOC(CH$_3$)═CH$_2$, or
(CF$_3$)$_2$CF(CF$_2$)$_3$CH$_2$CH(OH)CH$_2$OCOCH═CH$_2$.

11. The molding material according to claim 1, wherein the non-fluorinated compound contains one or more of the following compounds:
(meth)acrylic monomers in which an alkyl group having 1 to 20 carbon atoms is bonded to an ester terminal, vinylnorbornene, styrene, vinyl chloride, 1-hexene, 1-octene, 1-decene, 1-dodecene, isobutene, pentene, heptene, nonene, acetophenone, benzoin isopropyl ether, benzophenone, Michler's ketone, chlorothioxanthone, isopropylthioxanthone, benzyl dimethyl ketal, acetophenone diethyl ketal, α-hydroxycyclohexyl phenyl ketone, 2-hydroxy-2-methyl-phenylpropane and derivatives thereof, acetophenone O-benzoyloxime, nifedipine, 1,2-bis(4-methoxyphenyl)-2-oxoethyl cyclohexylcarbamate, 2-nitrobenzyl cyclohexylcarbamate, 2-(9-oxoxanthen-2-yl)propionic acid, 1,5,7-triazabicyclo[4.4.0]dec-5-ene and derivatives thereof, ethyl alcohol, isopropyl alcohol, toluene, xylene, hexane, cyclohexane, benzene, tetrahydrofuran, onium salts, sulfonium salts, or a cationic polymerization initiator that produces a Broensted acid or a Lewis acid.

12. The method according to claim 3, wherein the fluorine-containing compound is represented by one or more of formula (1) to (6) below:

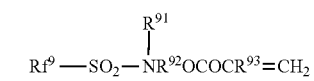 (1)

Rf$^9$—SO$_2$—NR$^{92}$OCOCR$^{93}$═CH$_2$

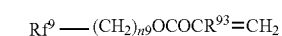 (2)

Rf$^9$—(CH$_2$)$_{n9}$OCOCR$^{93}$═CH$_2$

 (3)

Rf$^9$—CONR$^{92}$OCOCR$^{93}$═CH$_2$

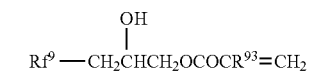 (4)

Rf$^9$—CH$_2$CHCH$_2$OCOCR$^{93}$═CH$_2$ (with OH)

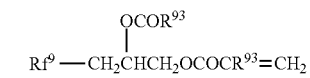 (5)

Rf$^9$—CH$_2$CHCH$_2$OCOCR$^{93}$═CH$_2$ (with OCOR$^{93}$)

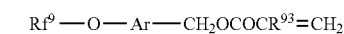 (6)

Rf$^9$—O—Ar—CH$_2$OCOCR$^{93}$═CH$_2$ wherein:
Rf$^9$ represents a perfluoroalkyl group having 1 to 6 carbon atoms;
R$^{91}$ represents a hydrogen atom or an alkyl group having 1 to 10 carbon atoms;
R$^{92}$ represents an alkylene group having 1 to 10 carbon atoms;

$R^{93}$ represents a hydrogen atom or a methyl group;
n9 represents an integer of 1 to 10; and
Ar represents an aryl group optionally having a substituent.

13. The method according to claim 3, wherein the fluorine-containing compound contains one or more of the following compounds:

$CF_3(CF_2)_5(CH_2)OCOCH{=}CH_2$,
$CF_3(CF_2)_5(CH_2)OCOC(CH_3){=}CH_2$,
$CF_3(CF_2)_7(CH_2)OCOCH{=}CH_2$,
$CF_3(CF_2)_7(CH_2)OCOC(CH_3){=}CH_2$,
$(CF_3)_2CF(CF_2)_3(CH_2)_2OCOCH{=}CH_2$,
$CF_3(CF_2)_3(CH_2)_2OCOC(CH_3){=}CH_2$,
$CF_3(CF_2)_3(CH_2)_2OCOCH{=}CH_2$,
$CF_3(CF_2)_5(CH_2)_2OCOC(CH_3){=}CH_2$,
$CF_3(CF_2)_5(CH_2)_2OCOCH{=}CH_2$,
$CF_3CF_2(CH_2)_2OCOCH{=}CH_2$,
$CF_3(CF_2)_3SO_2N(CH_3)(CH_2)_2OCOCH{=}CH_2$,
$CF_3(CF_2)_3SO_2N(C_2H_5)(CH_2)_2OCOC(CH_3){=}CH_2$,
$(CF_3)_2CF(CF_2)_3CH_2CH(OCOCH_3)CH_2OCOC(CH_3){=}CH_2$, or
$(CF_3)_2CF(CF_2)_3CH_2CH(OH)CH_2OCOCH{=}CH_2$.

14. The method according to claim 3, wherein the non-fluorinated compound contains one or more of the following compounds:

(meth)acrylic monomers in which an alkyl group having 1 to 20 carbon atoms is bonded to an ester terminal, vinylnorbornene, styrene, vinyl chloride, 1-hexene, 1-octene, 1-decene, 1-dodecene, isobutene, pentene, heptene, nonene, acetophenone, benzoin isopropyl ether, benzophenone, Michler's ketone, chlorothioxanthone, isopropylthioxanthone, benzyl dimethyl ketal, acetophenone diethyl ketal, α-hydroxycyclohexyl phenyl ketone, 2-hydroxy-2-methyl-phenylpropane and derivatives thereof, acetophenone O-benzoyloxime, nifedipine, 1,2-bis(4-methoxyphenyl)-2-oxoethyl cyclohexylcarbamate, 2-nitrobenzyl cyclohexylcarbamate, 2-(9-oxoxanthen-2-yl)propionic acid, 1,5,7-triazabicyclo[4.4.0]dec-5-ene and derivatives thereof, ethyl alcohol, isopropyl alcohol, toluene, xylene, hexane, cyclohexane, benzene, tetrahydrofuran, onium salts, sulfonium salts, or a cationic polymerization initiator that produces a Broensted acid or a Lewis acid.

* * * * *